United States Patent
Chen

(10) Patent No.: US 11,797,194 B2
(45) Date of Patent: Oct. 24, 2023

(54) METHOD AND APPARATUS FOR PERFORMING ACCESS MANAGEMENT OF MEMORY DEVICE IN HOST PERFORMANCE BOOSTER ARCHITECTURE WITH AID OF DEVICE SIDE TABLE INFORMATION

(71) Applicant: Silicon Motion, Inc., Hsinchu County (TW)

(72) Inventor: Yu-Ta Chen, Keelung (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 17/874,329

(22) Filed: Jul. 27, 2022

(65) Prior Publication Data

US 2022/0365689 A1 Nov. 17, 2022

Related U.S. Application Data

(63) Continuation of application No. 17/361,227, filed on Jun. 28, 2021, now Pat. No. 11,449,244.

(60) Provisional application No. 63/064,379, filed on Aug. 11, 2020.

(51) Int. Cl.
*G06F 3/06* (2006.01)

(52) U.S. Cl.
CPC .......... *G06F 3/0622* (2013.01); *G06F 3/0655* (2013.01); *G06F 3/0679* (2013.01)

(58) Field of Classification Search
CPC .... G06F 3/0622; G06F 3/0655; G06F 3/0679; G06F 3/061; G06F 3/064
See application file for complete search history.

(56) References Cited

U.S. PATENT DOCUMENTS

| 10,558,393 | B2 | 2/2020 | Shin | |
|---|---|---|---|---|
| 11,036,625 | B1 | 6/2021 | Balluchi | |
| 11,288,202 | B2 | 3/2022 | Byun | |
| 2007/0118713 | A1 | 5/2007 | Guterman | |
| 2008/0005507 | A1 | 1/2008 | Madnani | |
| 2017/0300422 | A1* | 10/2017 | Szubbocsev | ........ G06F 12/1009 |
| 2018/0157437 | A1* | 6/2018 | Sandberg | ............ G06F 3/0647 |

(Continued)

FOREIGN PATENT DOCUMENTS

| CN | 103577346 A | 2/2014 |
|---|---|---|
| CN | 108139902 A | 6/2018 |

(Continued)

*Primary Examiner* — Jane W Benner
(74) *Attorney, Agent, or Firm* — Winston Hsu

(57) ABSTRACT

A method and apparatus for performing access management of a memory device in a Host Performance Booster (HPB) architecture with aid of device side table information are provided. The method may include: sending internal information of the memory device to a host device, to allow the host device to store the internal information of the memory device in a memory within the host device as host side table information at the host device; generating and storing multiple entries of at least one address mapping control table into a random access memory (RAM) as at least one portion of device side table information at the memory device; determining at least two physical addresses associated with at least two logical addresses according to the at least one address mapping control table; and reading data from the NV memory according to the at least two physical addresses.

12 Claims, 16 Drawing Sheets

(56) References Cited

U.S. PATENT DOCUMENTS

| | | |
|---|---|---|
| 2019/0121576 A1 | 4/2019 | Jean |
| 2019/0235762 A1 | 8/2019 | Kaburaki |
| 2020/0125295 A1 | 4/2020 | Jean |
| 2020/0226072 A1 | 7/2020 | Kang |
| 2020/0356280 A1* | 11/2020 | Sela .................. G11C 11/409 |
| 2021/0303208 A1* | 9/2021 | Brief .................. G06F 3/0659 |
| 2021/0397370 A1 | 12/2021 | Chen |

FOREIGN PATENT DOCUMENTS

| | | |
|---|---|---|
| CN | 109992530 A | 7/2019 |
| CN | 110806987 A | 2/2020 |
| TW | 200935220 | 8/2009 |
| TW | 201923609 A | 6/2019 |

\* cited by examiner

| Byte \ Bit | 7 | 6 | 5 | 4 | 3 | 2 | 1 | 0 | |
|---|---|---|---|---|---|---|---|---|---|
| 0 | Operation Code ||||||||  |
| 1 | ||||||||  |
| 2 | (MSB) |||||||| |
| ⋮ | Logical Block Address |||||||| |
| 5 | |||||||(LSB)| |
| 6 | (MSB) |||||||| ⎫ |
| ⋮ | Hybrid Table Entry |||||||| ⎬ HTE |
| 13 | |||||||(LSB)| ⎭ |
| 14 | Transfer Length ||||||||  |
| 15 | Control = 00h ||||||||  |

METHOD AND APPARATUS FOR PERFORMING ACCESS MANAGEMENT OF MEMORY DEVICE IN HOST PERFORMANCE BOOSTER ARCHITECTURE WITH AID OF DEVICE SIDE TABLE INFORMATION

CROSS REFERENCE TO RELATED APPLICATIONS

This application is a continuation application of U.S. application Ser. No. 17/361,227, filed on Jun. 28, 2021, which claims the benefit of U.S. Provisional Application No. 63/064,379, filed on Aug. 11, 2020. The contents of these applications are incorporated herein by reference.

BACKGROUND OF THE INVENTION

1. Field of the Invention

The present invention is related to memory control, and more particularly, to a method for performing access management of a memory device in a Host Performance Booster (HPB) architecture with aid of device side table information, and associated apparatus such as the memory device, a controller thereof, an electronic device comprising the memory device, etc.

2. Description of the Prior Art

A memory device may comprise Flash memory for storing data, and the management of accessing the Flash memory is complicated. The memory device may comprise a RAM for purposes of buffering, management, etc. The storage capacity of the RAM is typically insufficient. The related art tries to correct the problem, but further problems are introduced. Thus, a novel method and associated architecture are needed for solving the problems without introducing any side effect or in a way that is less likely to introduce a side effect.

SUMMARY OF THE INVENTION

It is therefore an objective of the present invention to provide a method for performing access management of a memory device in a Host Performance Booster (HPB) architecture with aid of device side table information, and to provide associated apparatus such as the memory device, a controller thereof, an electronic device comprising the memory device, etc., in order to solve the above-mentioned problems.

It is another objective of the present invention to provide a method for performing access management of a memory device in a Host Performance Booster (HPB) architecture with aid of device side table information, and to provide associated apparatus such as the memory device, a controller thereof, an electronic device comprising the memory device, etc., in order to enhance the overall performance.

At least one embodiment of the present invention provides a method for performing access management of a memory device in a Host Performance Booster (HPB) architecture with aid of device side table information, where the method is applied to a memory controller of the memory device. The memory device may comprise the memory controller and a non-volatile (NV) memory, and the NV memory may comprise at least one NV memory element (e.g. one or more NV memory elements). The method may comprise: sending internal information of the memory device to a host device, to allow the host device to store the internal information of the memory device in a memory within the host device as host side table information at the host device; generating and storing multiple entries of at least one address mapping control table into a random access memory (RAM) within the memory controller as at least one portion of the device side table information at the memory device, wherein any entry of the multiple entries of the at least one address mapping control table comprises address information for address mapping, and the address information within said any entry indicates a mapping relationship between a physical address and a logical address, wherein the host side table information comprises address information respectively carried by the multiple entries of the at least one address mapping control table; in response to a reading request corresponding to at least two logical addresses from the host device, determining at least two physical addresses associated with the at least two logical addresses according to the at least one address mapping control table, wherein the reading request carries partial information of the host side table information; and reading data corresponding to the reading request from the NV memory according to the at least two physical addresses, for returning the data to the host device.

In addition to the above method, the present invention also provides a memory device, and the memory device comprises an NV memory and a controller. The NV memory is arranged to store information, wherein the NV memory may comprise at least one NV memory element (e.g. one or more NV memory elements). The controller is coupled to the NV memory, and the controller is arranged to control operations of the memory device. In addition, the controller comprises a processing circuit that is arranged to control the controller according to a plurality of host commands from a host device, to allow the host device to access the NV memory through the controller. The controller further comprises a random access memory (RAM) that is coupled to the processing circuit, where the RAM is arranged to provide the controller with internal storage space. For example, the controller sends internal information of the memory device to the host device, to allow the host device to store the internal information of the memory device in a memory within the host device as host side table information at the host device; the controller generates and stores multiple entries of at least one address mapping control table into a random access memory (RAM) within the controller as at least one portion of device side table information at the memory device, wherein any entry of the multiple entries of the at least one address mapping control table comprises address information for address mapping, and the address information within said any entry indicates a mapping relationship between a physical address and a logical address, wherein the host side table information comprises address information respectively carried by the multiple entries of the at least one address mapping control table; in response to a reading request corresponding to at least two logical addresses from the host device, the controller determines at least two physical addresses associated with the at least two logical addresses according to the at least one address mapping control table, wherein the reading request carries partial information of the host side table information; and the controller reads data corresponding to the reading request from the NV memory according to the at least two physical addresses, for returning the data to the host device.

According to some embodiments, an associated electronic device is also provided. The electronic device may comprise the above memory device, and may further comprise a host device, and the host device may be coupled to the memory device. The host device may comprise: at least one processor, arranged for controlling operations of the host device; and a power supply circuit, coupled to the at least one processor, arranged for providing power to the at least one processor and the memory device. In addition, the memory device may provide the host device with storage space.

In addition to the above method, the present invention also provides a controller of a memory device, where the memory device comprises the controller and an NV memory. The NV memory may comprise at least one NV memory element (e.g. one or more NV memory elements). In addition, the controller comprises a processing circuit that is arranged to control the controller according to a plurality of host commands from a host device, to allow the host device to access the NV memory through the controller. The controller further comprises a random access memory (RAM) that is coupled to the processing circuit, where the RAM is arranged to provide the controller with internal storage space. For example, the controller sends internal information of the memory device to the host device, to allow the host device to store the internal information of the memory device in a memory within the host device as host side table information at the host device; the controller generates and stores multiple entries of at least one address mapping control table into a random access memory (RAM) within the controller as at least one portion of device side table information at the memory device, wherein any entry of the multiple entries of the at least one address mapping control table comprises address information for address mapping, and the address information within said any entry indicates a mapping relationship between a physical address and a logical address, wherein the host side table information comprises address information respectively carried by the multiple entries of the at least one address mapping control table; in response to a reading request corresponding to at least two logical addresses from the host device, the controller determines at least two physical addresses associated with the at least two logical addresses according to the at least one address mapping control table, wherein the reading request carries partial information of the host side table information; and the controller reads data corresponding to the reading request from the NV memory according to the at least two physical addresses, for returning the data to the host device.

According to some embodiments, the apparatus may comprise at least one portion (e.g. a portion or all) of the electronic device. For example, the apparatus may comprise the memory controller within the memory device. In another example, the apparatus may comprise the memory device. In some examples, the apparatus may comprise the electronic device or a host device within the electronic device. In addition, the memory controller of the memory device can control the operations of the memory device according to the method. For example, the memory device can store data for the host device in response to a host command such as a write command from the host device. The memory device can read the stored data in response to another host command such as a read command from the host device, and provide the host device with the data read from the NV memory. Additionally, the NV memory may comprise one or more NV memory elements (e.g. one or more Flash memory dies, or one or more Flash memory chips). In order to enhance the performance of the memory device, the host device may obtain some internal information of the memory device. The host device may send back the internal information previously obtained from the memory device toward the memory device, to allow the memory device to use the internal information, where the memory device may utilize and share the RAM of the host device. According to some embodiments, the memory device can be configured to generate or update the device side table information corresponding to the internal information of the memory device. For example, the memory device can receive a packet carrying a portion of the internal information from the host device, and recover more portions of the internal information according to the device side table information corresponding to the internal information, for enhancing reading performance of the memory device.

The present invention method and apparatus can guarantee that the memory device can operate properly in various situations. For example, the internal information sent from the host device may be incorrect, and the present invention method and apparatus can detect this situation and prevent malfunction, etc. of the memory device. In addition, the information may be altered, and the present invention method and apparatus can detect this situation and prevent some security issues. Additionally, the present invention method and apparatus can recover more portions of the internal information according to the device side table information corresponding to the internal information, to make the whole system be suitable for operating according to one or more newer specifications (e.g. Host Performance Booster (HPB) 2.0 supposed to be promoted together with Universal Flash Storage (UFS) 3.1) and to improve the random read speed of the memory device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
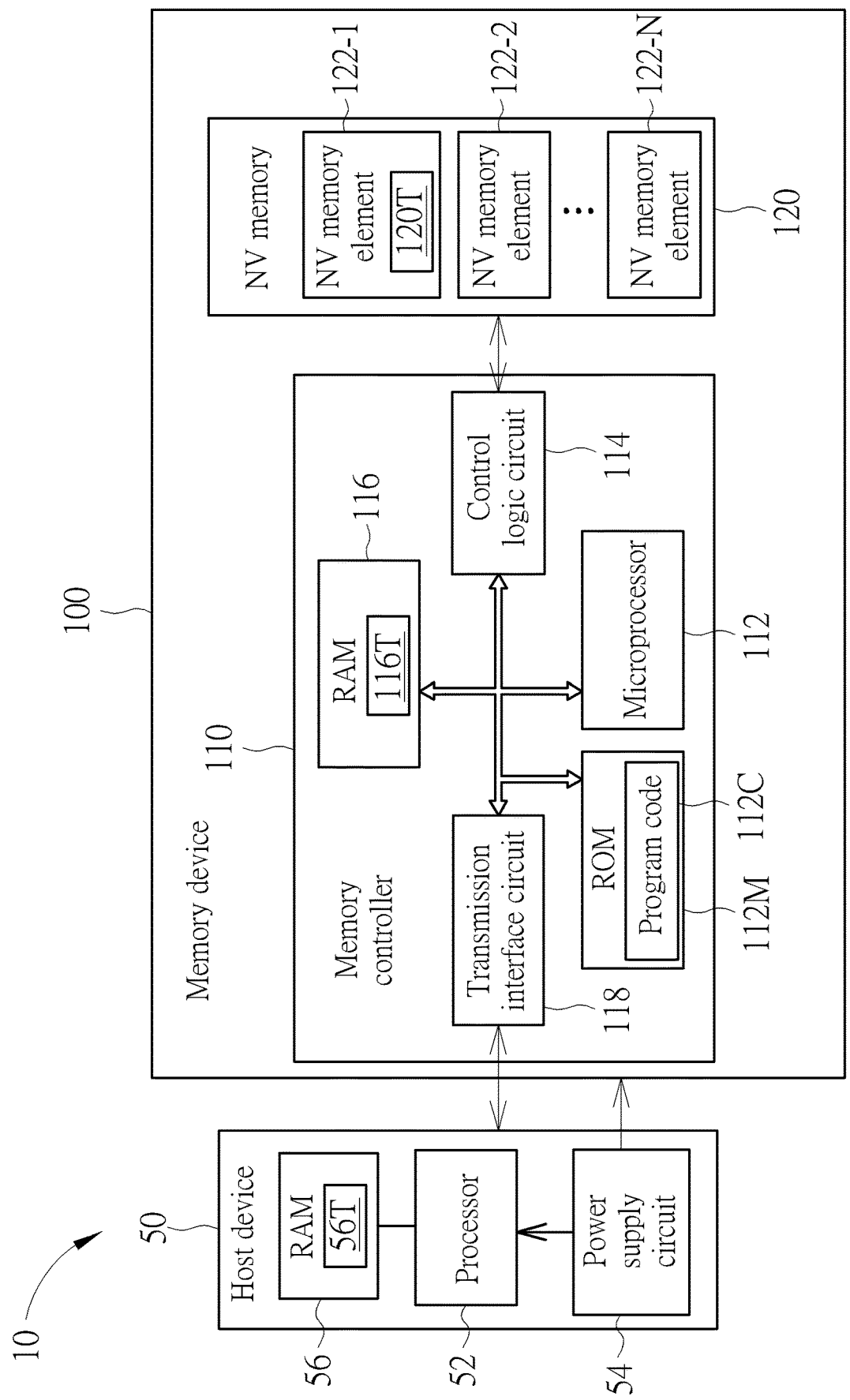
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g. one or more processors) which may be collectively referred to as the processor 52, a power supply circuit 54, and at least one random access memory (RAM) (e.g. one or more RAMs, such as a dynamic RAM (DRAM), a static RAM (SRAM), etc.) which may be collectively referred to as the RAM 56), where the processor 52 and the RAM 56 may be coupled to each other through a bus, and may be coupled to the power supply circuit 54 to obtain power. The processor 52 may be arranged to control operations of the host device 50, the power supply circuit 54 may be arranged to provide the processor 52, the RAM 56, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g. a memory card conforming to the SD/MMC, CF, MS or XD specification), a solid state drive (SSD), and various types of embedded memory devices (e.g. am embedded memory device conforming to the UFS or eMMC specification). According to this embodiment, the memory device 100 may comprise a controller such as a memory controller 110, and may further comprise a non-volatile (NV) memory 120, where the controller is arranged to access the NV memory 120, and the NV memory 120 is arranged to store information. The NV memory 120 may comprise at least one NV memory element (e.g. one or more NV memory elements), such as a plurality of NV memory elements 122-1, 122-2, . . . , and 122-N, where "N" may represent a positive integer that is greater than one. For example, the NV memory 120 may be a flash memory, and the plurality of NV memory elements 122-1, 122-2, . . . , and 122-N may be a plurality of flash memory chips or a plurality of flash memory dies, respectively, but the present invention is not limited thereto.

As shown in FIG. 1, the memory controller 110 may comprise a processing circuit such as a microprocessor 112, a storage unit such as a read only memory (ROM) 112M, a control logic circuit 114, a RAM 116 (which may be implemented by way of SRAM, for example), and a transmission interface circuit 118, where at least one portion (e.g. a portion or all) of the above components may be coupled to one another via a bus. The RAM 116 may be arranged to provide the memory controller 110 with internal storage space (for example, may temporarily store information), but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory. Additionally, the control logic circuit 114 may be arranged to control the NV memory 120. The control logic circuit 114 may comprise an error correction code (ECC) circuit (not shown in FIG. 1), which may perform ECC encoding and ECC decoding, to protect data, and/or perform error correction, and the transmission interface circuit 118 may conform to a specific communications specification (e.g. the Serial Advanced Technology Attachment (SATA) specification, Universal Serial Bus (USB) specification, Peripheral Component Interconnect Express (PCIE) specification, embedded Multi Media Card (eMMC) specification, or Universal Flash Storage (UFS) specification), and may perform communications according to the specific communications specification.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programing upon the memory units or data pages of specific physical addresses within the NV memory 120, where the physical addresses correspond to the logical addresses. For example, the memory controller 110 may generate or update at least one logical-to-physical (H2F) address mapping table to manage the mapping relationships between the physical addresses and the logical addresses. The NV memory 120 may store a global H2F address mapping table 120T, for the memory controller 110 to control the memory device 100 to access data in the NV memory 120.

For better comprehension, the global H2F address mapping table 120T may be located in a predetermined region within the NV memory element 122-1, such as a system region, but the present invention is not limited thereto. For example, the global H2F address mapping table 120T may be divided into a plurality of local H2F address mapping tables, and the local H2F address mapping tables may be stored in one or more of the NV memory elements 122-1, 122-2, . . . , and 122-N, and more particularly, may be stored in the NV memory elements 122-1, 122-2, . . . , and 122-N, respectively. When there is a needed, the memory controller 110 may load at least one portion (e.g. a portion or all) of the global H2F address mapping table 120T into the RAM 116 or other memories. For example, the memory controller 110 may load a local H2F address mapping table of the plurality of local H2F address mapping tables into the RAM 116 to be a temporary H2F address mapping table 116T therein, for accessing data in the NV memory 120 according to local H2F address mapping table, but the present invention is not limited thereto.

In addition, the aforementioned at least one NV memory element (e.g. the one or more NV memory elements such as {122-1, 122-2, . . . , 122-N}) may comprise a plurality of blocks, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-n (where "n" may represent any integer in the interval [1, N]) within the NV memory elements 122-1, 122-2, . . . , and 122-N, may comprise multiple blocks, and a block within the multiple blocks may comprise and record specific number of pages, where the memory controller 110 may access a certain page of a certain block within the multiple blocks according to a block address and a page address. For another example, the NV memory element 122-n may comprise multiple planes, where a plane may comprise a set of blocks such as the aforementioned multiple blocks, and the memory controller 110 may specify a certain plane within the multiple planes according to a plane number, to access a certain page of a certain block of this plane. As the total number of blocks increases, the storage space of the NV memory 120 may become larger. Regarding manufacturing the NV memory 120, many technologies may be utilized, for example: a 2D/planar NAND flash technology, which may arrange memory cells into a single layer; and a 3D NAND flash technology, which may arrange the memory cells into a vertical stack of multiple layers. According to some embodiments, the NV memory 120 may be implemented as a 2D/planar NAND flash structure with the memory cells arranged in a single layer. According to some embodiments, the NV memory 120 may be implemented as a 3D NAND flash structure with multiple layers of memory cells stacked vertically. In this situation, the storage space of the NV memory 120 may become very large.

According to some embodiments, the memory controller 110 may transmit a local H2F address mapping table of the plurality of local H2F address mapping tables and corresponding protection information of this local H2F address mapping table (e.g. a physical address of this local H2F address mapping table, such as the latest physical address indicating the latest location where this local H2F address mapping table is stored in the NV memory 120) to the host device 50, for being temporarily stored in the RAM 56 as a host-side table such as a hybrid table 56T (e.g. under control of the processor 52), in order to save the storage space of the RAM 116. In this situation, when accessing data in the memory device 100, the host device 50 may send one or more hybrid table entries of the hybrid table 56T to the memory controller 110, and the memory controller 110 may access the data according to the one or more hybrid table entries for the host device 50, where any hybrid table entry of the one or more hybrid table entries may comprise a physical address and the protection information thereof. If the protection information indicates that this physical address (more particularly, the whole of the hybrid table 56T) is incorrect, the memory controller 110 may load the local H2F address mapping table from the NV memory 120 into the RAM 116 according to the latest physical address of the local H2F address mapping table, to be the temporary H2F address mapping table 116T, and access the data according to the temporary H2F address mapping table 116T in the RAM 116. For example, the memory controller 110 may maintain a latest-table-address table in the RAM 116, and the latest-table-address table may comprise respective latest table addresses of the plurality of local H2F address mapping tables. When the physical address of this local H2F address mapping table does not match the latest physical address of this local H2F address mapping table, the memory controller 110 may determine that this physical address (more particularly, the whole of the hybrid table 56T) is incorrect.

Figures 2, 3:
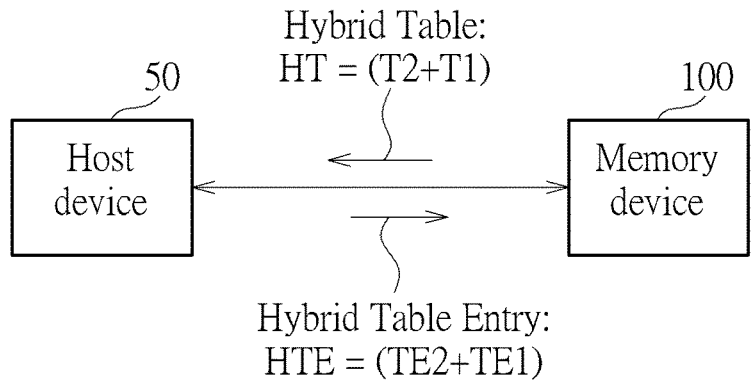
FIG. 2 illustrates a control scheme of a method for performing access management of a memory device such as that shown in FIG. 1 according to an embodiment of the present invention.
FIG. 3 illustrates an example of a Host Performance Booster (HPB) entry packet carrying a corresponding hybrid table entry in the control scheme shown in FIG. 2.

FIG. 2 illustrates a control scheme of a method for performing access management of a memory device such as that shown in FIG. 1 according to an embodiment of the present invention. The memory controller 110 may transmit a combination of multiple tables, such as a hybrid table HT comprising two tables T1 and T2, to the host device 50 to be the hybrid table 56T (labeled "HT=(T2+T1)" for brevity), where the two tables T1 and T2 may represent the local H2F address mapping table and a protection information table comprising the corresponding protection information of this local H2F address mapping table, respectively. For example, the hybrid table HT may comprise multiple hybrid table entries {HTE} respectively corresponding to a series of logical addresses and may be configured for mapping the series of logical addresses to associated physical addresses recorded in the multiple hybrid table entries {HTE}, respectively. Any hybrid table entry HTE of the multiple hybrid table entries {HTE} of the hybrid table HT (e.g. each hybrid table entry thereof) may comprise a table entry TE1 of the table T1 (e.g. a physical address of the associated physical addresses recorded in the multiple hybrid table entries {HTE}) and a table entry TE2 of the table T2 (e.g. the protection information of this local H2F address mapping table, such as the physical address of this local H2F address mapping table, for checking whether this local H2F address mapping table is correct or checking whether this physical address is correct).

When reading one or more sets of data from the memory device 100, the host device 50 may send at least one packet for indicating the reading request (e.g. a read command packet carrying a read command, a starting logical address, and a data length) to the memory controller 110, and more particularly, may send a Host Performance Booster (HPB) entry packet carrying a corresponding hybrid table entry HTE of the multiple hybrid table entries {HTE} to the memory controller 110, where the corresponding hybrid table entry HTE may comprise a table entry TE1 such as an associated physical address corresponding to the starting logical address and comprise a table entry TE2 such as the protection information of this local H2F address mapping table (labeled "HTE=(TE2+TE1)" for brevity). For example, the aforementioned at least one packet may comprise the HPB entry packet, and may be implemented by way of a HPB READ command, and the HPB READ command may comprise an operation code, a logical block address (LBA) indicating the starting logical address, an HPB entry indicating the corresponding hybrid table entry HTE, a transfer length indicating the data length, etc. According to the table entry TE2 such as the protection information of this local H2F address mapping table, the memory controller 110 may determine whether the table T1 such as this local H2F address mapping table (e.g. the table entry TE1 such as the associated physical address corresponding to the starting logical address) is correct. For example, when the protection information in the table entry TE2, such as the physical address of this local H2F address mapping table, matches the latest physical address of this local H2F address mapping table, the memory controller 110 may determine that this local H2F address mapping table (e.g. this physical address) is correct, and may further access the one or more sets of data in the NV memory 120 according to the table entry TE1 such as the associated physical address corresponding to the starting logical address for the host device 50.

According to some embodiments, the two tables T1 and T2 may represent at least one local H2F address mapping table (e.g. one or more local H2F address mapping tables of the plurality of local H2F address mapping tables, such as the local H2F address mapping table mentioned in one or more of the above embodiments) and a protection information table comprising the corresponding protection information of the aforementioned at least one local H2F address mapping table, respectively.

FIG. 3 illustrates an example of the HPB entry packet carrying the corresponding hybrid table entry HTE in the control scheme shown in FIG. 2. As the HPB entry packet shown in FIG. 3 satisfies some requirements of the HPB READ command as defined in the HPB specification (e.g. HPB 1.0, etc.), the HPB entry packet can be utilized as the HPB READ command, where the corresponding hybrid table entry HTE can be utilized as the HPB entry.

Figure 4:
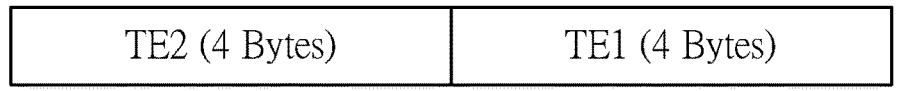
FIG. 4 illustrates an example of an HPB entry format of the control scheme shown in FIG. 2.

FIG. 4 illustrates an example of an HPB entry format of the control scheme shown in FIG. 2, where this HPB entry format is suitable for an HPB architecture conforming to the HPB specification. According to the HPB entry format shown in FIG. 4, in the aforementioned any hybrid table entry HTE of the multiple hybrid table entries {HTE} of the hybrid table HT, the table entry TE1 may have 4 bytes, and the table entry TE2 may also have 4 bytes.

TABLE 1

| HPB entry | T2 Content | T1 Content |
|---|---|---|
| 0 | 0x00004030 | 0x0000A000 |
| 1 | 0x00004030 | 0x0000A001 |
| 2 | 0x00004030 | 0x0000A002 |
| 3 | 0x00004030 | 0x0000A003 |
| 4 | 0x00004030 | 0x0000A004 |
| 5 | 0x00004030 | 0x0000A005 |
| 6 | 0x00004030 | 0x0000B009 |
| 7 | 0x00004030 | 0x0000A007 |
| 8 | 0x00004030 | 0x0000A008 |
| 9 | 0x00004030 | 0x0000A009 |
| 10 | 0x00004030 | 0x0000A00A |
| 11 | 0x00004030 | 0x0000B00A |
| 12 | 0x00004030 | 0x0000A00C |
| . . . | . . . | . . . |

Table 1 illustrates an example of the hybrid table HT, where the notation " . . . " indicates that some table contents may be omitted for brevity. The HPB entries {0, 1, . . . } of Table 1 may represent the multiple hybrid table entries {HTE}. In addition, the T1 and T2 contents (e.g. hexadecimal values) of Table 1 may represent the contents of the tables T1 and T2 (e.g. respective table entries {TE1} and {TE2} of the tables T1 and T2), respectively. The physical addresses {0x0000A000, 0x0000A001, . . . } that appear in the T1 contents may be taken as examples of the associated physical addresses corresponding to the series of logical addresses, and the physical address 0x00004030 that repeatedly appears to be the physical addresses {0x00004030, 0x00004030, . . . } in the T2 contents may be taken as an example of the physical address of the local H2F address mapping table.

Figure 5:
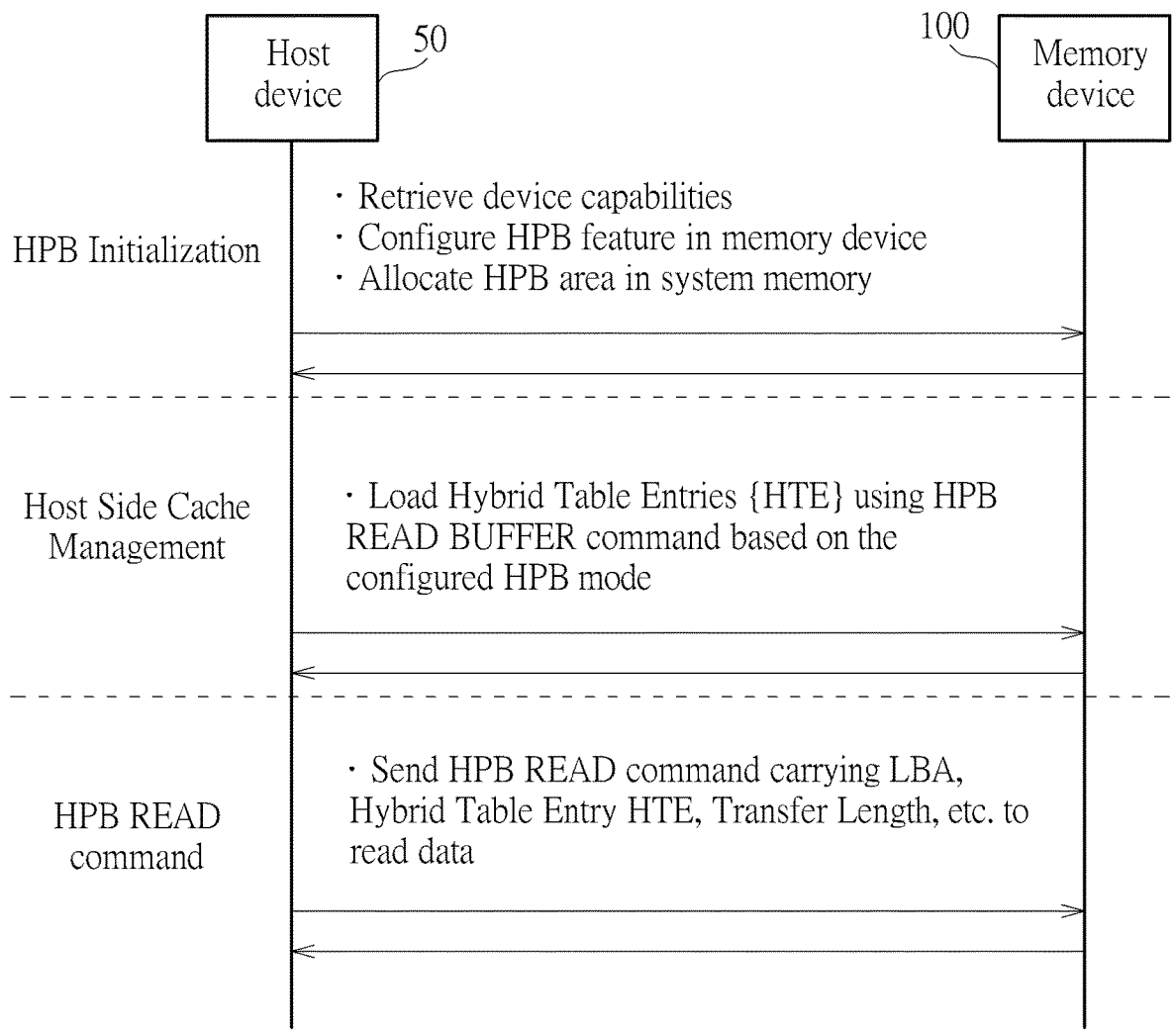
FIG. 5 illustrates some operations regarding utilizing multiple hybrid table entries of the control scheme shown in FIG. 2 according to an embodiment of the present invention.

FIG. 5 illustrates some operations regarding utilizing the multiple hybrid table entries {HTE} of the control scheme shown in FIG. 2 according to an embodiment of the present invention. During an HPB initialization phase, the host device 50 can be arranged to retrieve device capabilities of the memory device 100, configure one or more HPB features in the memory device 100, and allocate an HPB area in the system memory (e.g. the RAM 56) for the host-side table such as the hybrid table 56T. During a Host Side Cache Management phase, the host device 50 can be arranged to load the multiple hybrid table entries {HTE} from the memory device 100 by using the HPB READ BUFFER command of the HPB specification based on the configured HPB mode. During a HPB READ command phase, the host device 50 can be arranged to send the HPB READ command carrying the LBA, the corresponding hybrid table entry HTE, the transfer length, etc. to the memory device 100 to read data. For brevity, similar descriptions for this embodiment are not repeated in detail here.

Figure 6:
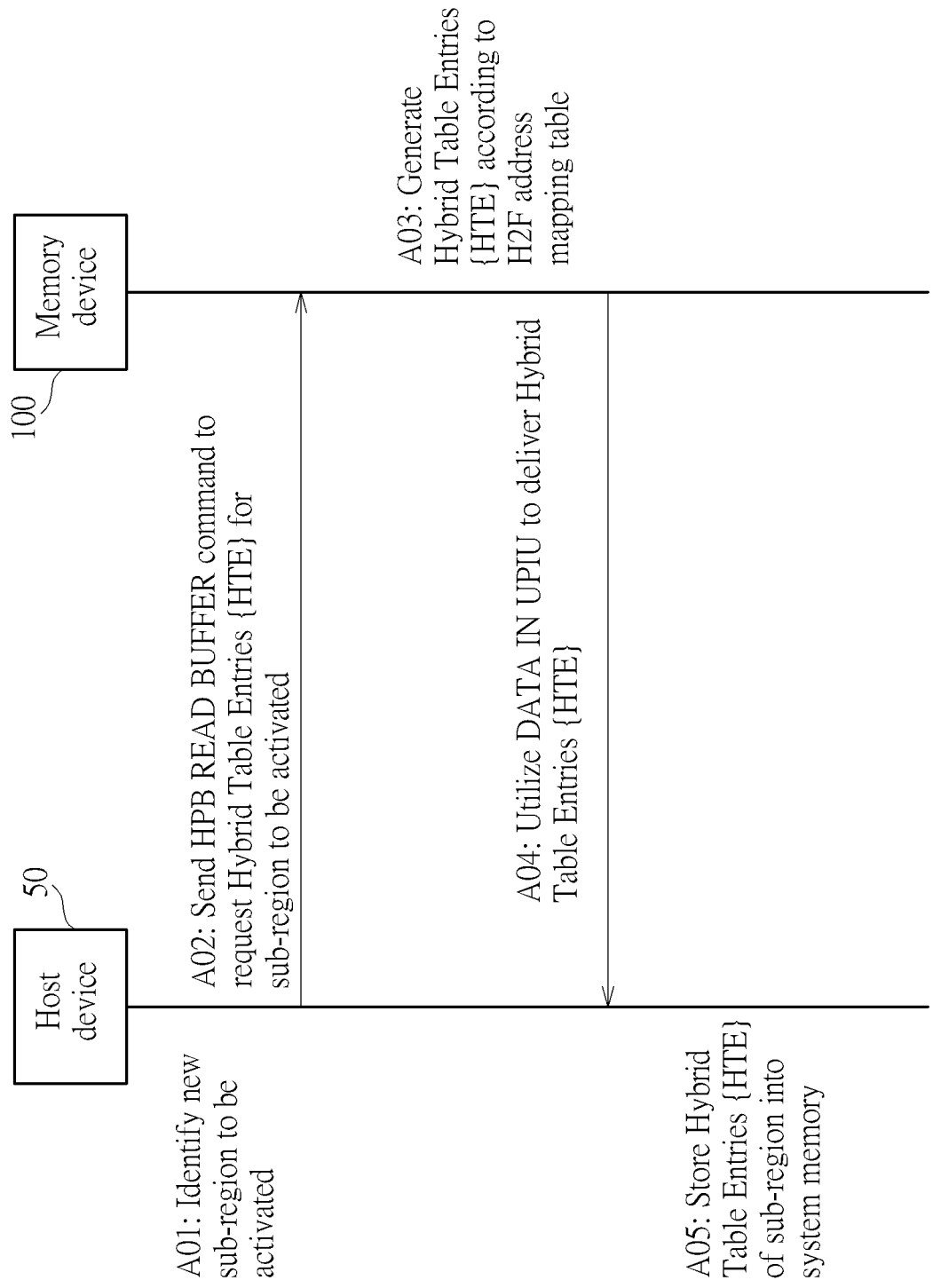
FIG. 6 illustrates some operations regarding delivering a set of hybrid table entries through DATA IN UFS Protocol Information Unit (UPIU) according to an embodiment of the present invention.

FIG. 6 illustrates some operations regarding delivering a set of hybrid table entries {HTE} (e.g. the multiple hybrid table entries {HTE}) through a DATA IN UFS Protocol Information Unit (UPIU) according to an embodiment of the present invention.

In Step A01, the host device 50 can be arranged to identify a new sub-region to be activated.

In Step A02, the host device 50 can be arranged to send the HPB READ BUFFER command to request the set of hybrid table entries {HTE} (e.g. the multiple hybrid table entries {HTE}) for the sub-region to be activated.

In Step A03, the memory device 100 can be arranged to generate the set of hybrid table entries {HTE} (e.g. the multiple hybrid table entries {HTE}) according to the aforementioned at least one H2F address mapping table (e.g. the local H2F address mapping table).

In Step A04, the memory device 100 can be arranged to utilize the DATA IN UPIU to deliver the set of hybrid table entries {HTE} to the host device 50.

In Step A05, the host device 50 can be arranged to store the set of hybrid table entries {HTE} of the sub-region into the system memory (e.g. the RAM 56). For brevity, similar descriptions for this embodiment are not repeated in detail here.

Figure 7:
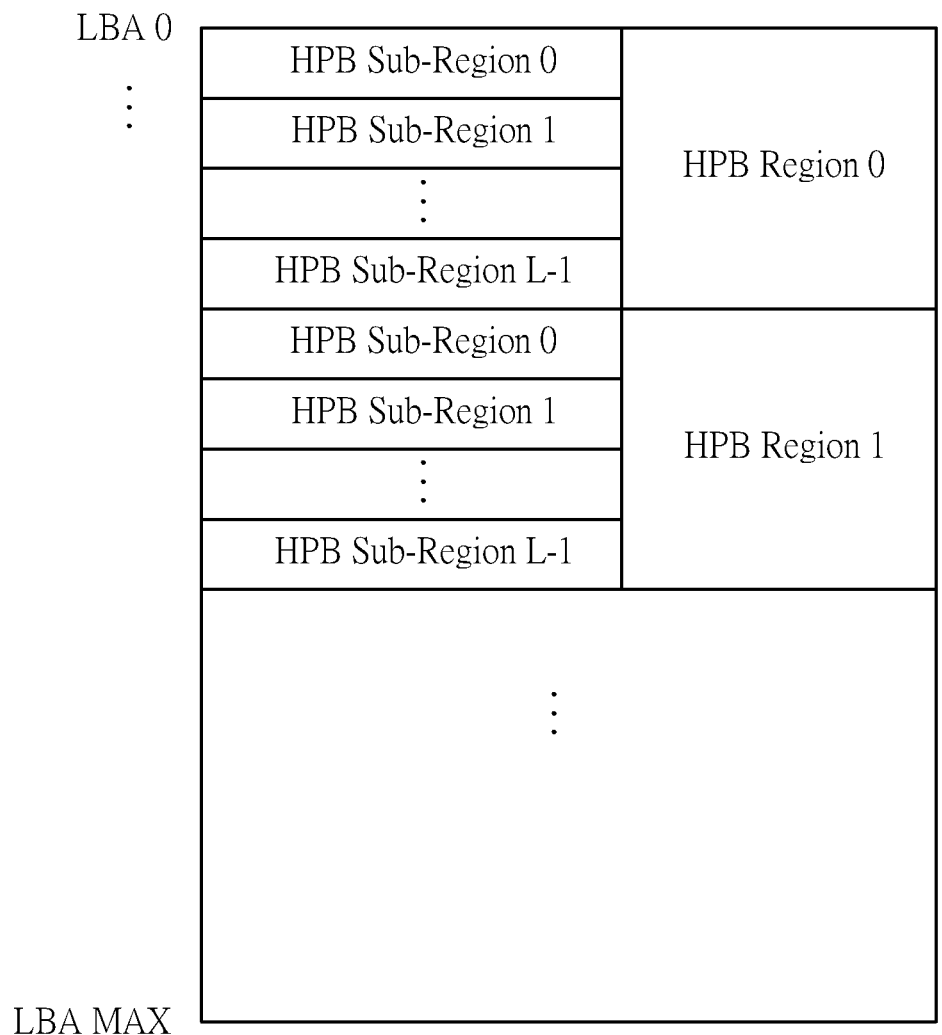
FIG. 7 illustrates some HPB regions and associated HPB sub-regions regarding the storage space provided by the memory device in the electronic device shown in FIG. 1 according to an embodiment of the present invention.

FIG. 7 illustrates some HPB regions and associated HPB sub-regions regarding the storage space provided by the memory device 100 (e.g. the storage space of the NV memory 120) in the electronic device 10 shown in FIG. 1 according to an embodiment of the present invention. The host device 50 can be configured to utilize the storage space provided by the memory device 100 as at least one logical unit (e.g. at least one partition), and access any logical unit (e.g. any partition) of the aforementioned at least one logical unit through a plurality of LBAs. The logical address range of the plurality of LBAs for accessing this logical unit can be divided into a plurality of HPB regions such as the HPB regions 0, 1, etc., and each HPB region of the plurality of HPB regions can be divided into at least one HPB sub-region (e.g. one or more HPB sub-regions) such as HPB sub-regions 0, 1, etc. For example, each of the HPB regions 0, 1, etc. may have L HPB sub-regions 0, 1, . . . and (L−1), where the beginning of the HPB sub-region 0 of the HPB region 0 may correspond to the beginning of the logical address range (e.g. the first LBA such as LBA 0), and the end of the last HPB sub-region of the last HPB region of the HPB regions 0, 1, etc. may correspond to the end of the logical address range (e.g. the last LBA such as LBA_Max), but the present invention is not limited thereto. In addition, the HPB sub-regions 0, 1, . . . and (L−1) can be taken as examples of the sub-region in the embodiment shown in FIG. 6.

According to some embodiments, the size of each of the HPB regions 0, 1, etc. and the size of each of the HPB sub-regions 0, 1, . . . and (L−1) can be determined according to various requirements. For example, both of the size of each of the HPB regions 0, 1, etc. and the size of each of the HPB sub-regions 0, 1, . . . and (L−1) can be 32 megabytes (MB). In some examples, the size of each of the HPB regions 0, 1, etc. can be 32 MB, and the size of each of the HPB sub-regions 0, 1, . . . and (L−1) can be 4 MB, 8 MB or 16 MB.

Figure 8:
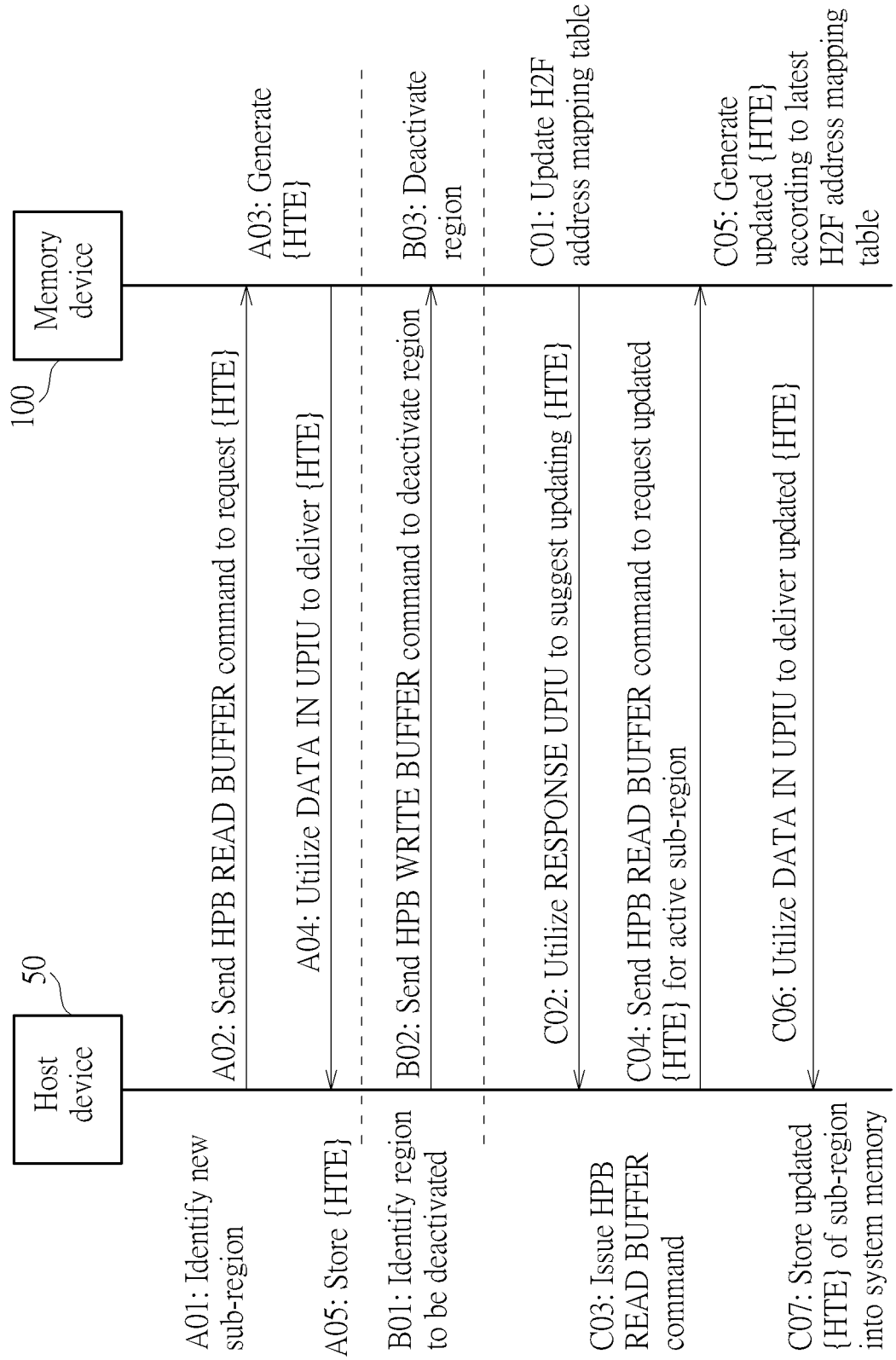
FIG. 8 illustrates some operations of a host control mode according to an embodiment of the present invention.

FIG. 8 illustrates some operations of a host control mode according to an embodiment of the present invention. The operations of Steps A01-A05 of this embodiment can be the same as that of the embodiment shown in FIG. 6.

In Step B01, the host device 50 can be arranged to identify a region to be deactivated (e.g. one of the HPB regions 0, 1, etc.).

In Step B02, the host device 50 can be arranged to send the HPB WRITE BUFFER command to the memory device 100 in order to deactivate the region.

In Step B03, the memory device 100 can be arranged to deactivate the region, for example, by invalidating some device side table information corresponding to the region.

In Step C01, the memory device 100 can be arranged to update the aforementioned at least one H2F address mapping table (e.g. a certain local H2F address mapping table), for example, in response to a processing result of a garbage collection (GC) procedure running on the memory controller 110 (e.g. the microprocessor 112), but the present invention is not limited thereto.

In Step C02, the memory device 100 can be arranged to utilize a RESPONSE UPIU to suggest updating a certain set of hybrid table entries {HTE} (e.g. the multiple hybrid table entries {HTE}) of an active sub-region (e.g. one of the HPB sub-regions 0, 1, . . . and (L−1) of one of the HPB regions 0, 1, etc.) in the system memory (e.g. the RAM 56) of the host device 50, where this set of hybrid table entries {HTE} may be generated and provided by the memory device 100 according to a previous version of the aforementioned at least one H2F address mapping table (e.g. a previous version of the local H2F address mapping table) before the operation of Step C01.

In Step C03, the host device 50 can be arranged to issue the HPB READ BUFFER command in response to the suggestion of the memory device 100.

In Step C04, the host device 50 can be arranged to send the HPB READ BUFFER command to request a set of updated hybrid table entries {HTE} (e.g. the latest version of the multiple hybrid table entries {HTE}) for the active sub-region.

In Step C05, the memory device 100 can be arranged to generate the set of updated hybrid table entries {HTE} (e.g. the latest version of the multiple hybrid table entries {HTE}) according to the latest H2F address mapping table such as the latest version of the aforementioned at least one H2F address mapping table (e.g. the latest version of the local H2F address mapping table).

In Step C06, the memory device 100 can be arranged to utilize the DATA IN UPIU to deliver the set of updated hybrid table entries {HTE} to the host device 50.

In Step C07, the host device 50 can be arranged to store the set of updated hybrid table entries {HTE} of this sub-region into the system memory (e.g. the RAM 56). For brevity, similar descriptions for this embodiment are not repeated in detail here.

Figure 9:
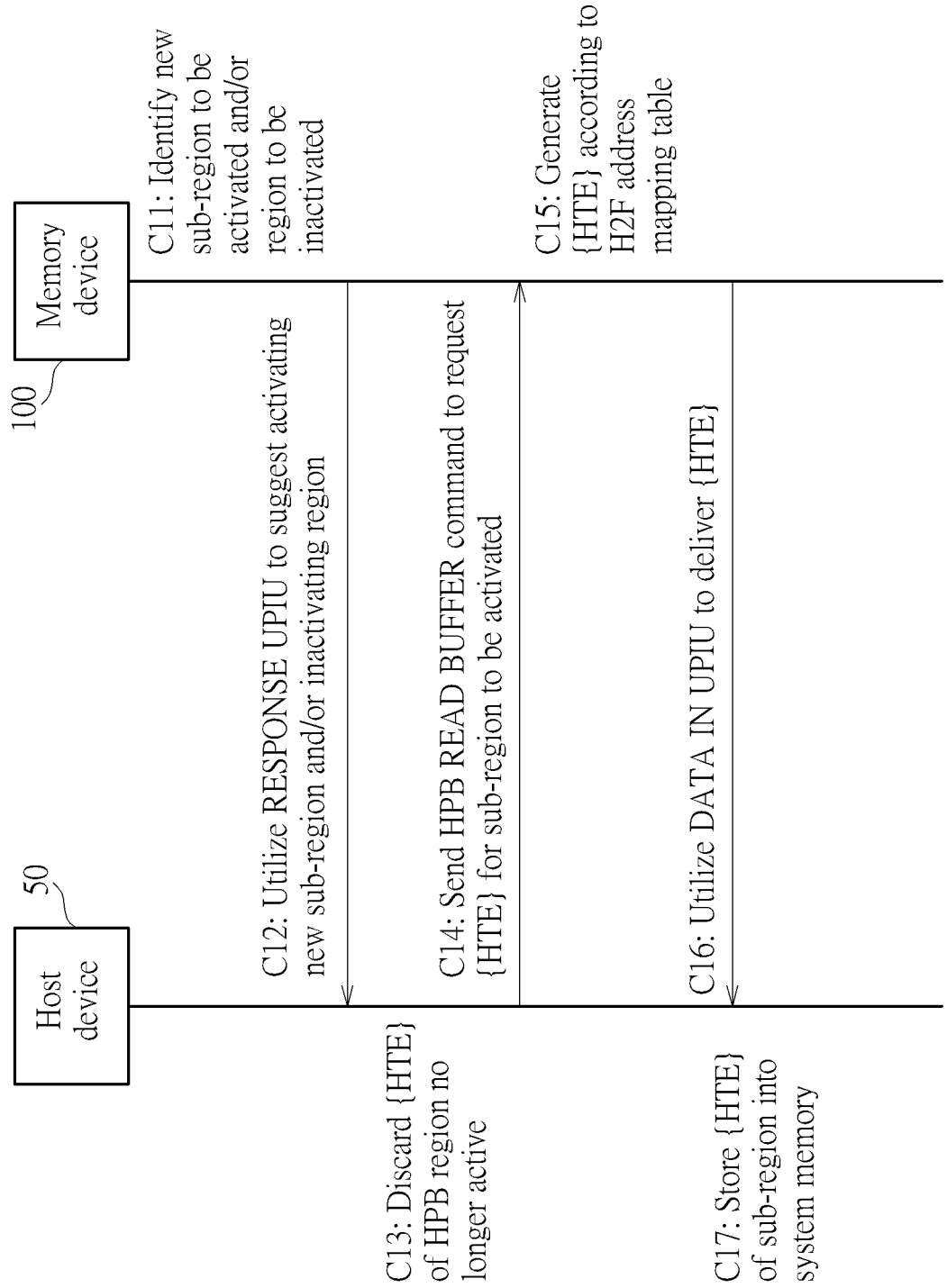
FIG. 9 illustrates some operations of a device control mode according to an embodiment of the present invention.

FIG. 9 illustrates some operations of a device control mode according to an embodiment of the present invention.

In Step C11, the memory device 100 can be arranged to identify a new sub-region to be activated (e.g. one of the HPB sub-regions 0, 1, . . . and (L−1) of one of the HPB regions 0, 1, etc.) and/or a region to be inactivated/deactivated (e.g. one of the HPB regions 0, 1, etc.) when there is a need.

In Step C12, the memory device 100 can be arranged to utilize the RESPONSE UPIU to suggest activating the new sub-region and/or inactivating the region.

In Step C13, the host device 50 can be arranged to discard a set of invalid hybrid table entries {HTE} of the HPB region that is no longer active (e.g. the region being inactivated).

In Step C14, the host device 50 can be arranged to send the HPB READ BUFFER command to request a set of hybrid table entries {HTE} (e.g. the multiple hybrid table entries {HTE}) for the sub-region to be activated.

In Step C15, the memory device 100 can be arranged to generate the set of hybrid table entries {HTE} (e.g. the multiple hybrid table entries {HTE}) according to the aforementioned at least one H2F address mapping table (e.g. a certain local H2F address mapping table).

In Step C16, the memory device 100 can be arranged to utilize the DATA IN UPIU to deliver the set of hybrid table entries {HTE} to the host device 50.

In Step C17, the host device 50 can be arranged to store the set of hybrid table entries {HTE} of this sub-region into the system memory (e.g. the RAM 56). For brevity, similar descriptions for this embodiment are not repeated in detail here.

According to some embodiments, activation can be performed and managed in the unit of sub-region (e.g. HPB sub-region), while inactivation/deactivation can be performed and managed in the unit of region (e.g. HPB region). For example, regarding activation, the HPB READ BUFFER command may comprise multiple fields such as HPB Region, HPB Sub-region, Allocation Length, etc. for indicating the HPB region to be activated, the HPB sub-region to be activated, the associated allocation length, etc. For another example, regarding inactivation/deactivation, the HPB WRITE BUFFER command may comprise multiple fields such as HPB Region, etc. for indicating the HPB region to be inactivated/deactivated, etc.

According to some embodiments, the memory device 100 (e.g. the memory controller 110) can be configured to manage at least one device side table (e.g. one or more device side tables) within the RAM 116, such as the hybrid table HT, one or more derivative tables of the hybrid table HT, one or more derivative tables of the temporary H2F address mapping table 116T, etc., and more particularly, determine whether to mark the aforementioned at least one device side table as invalid according to whether the HPB WRITE BUFFER command is received.

Figure 10:
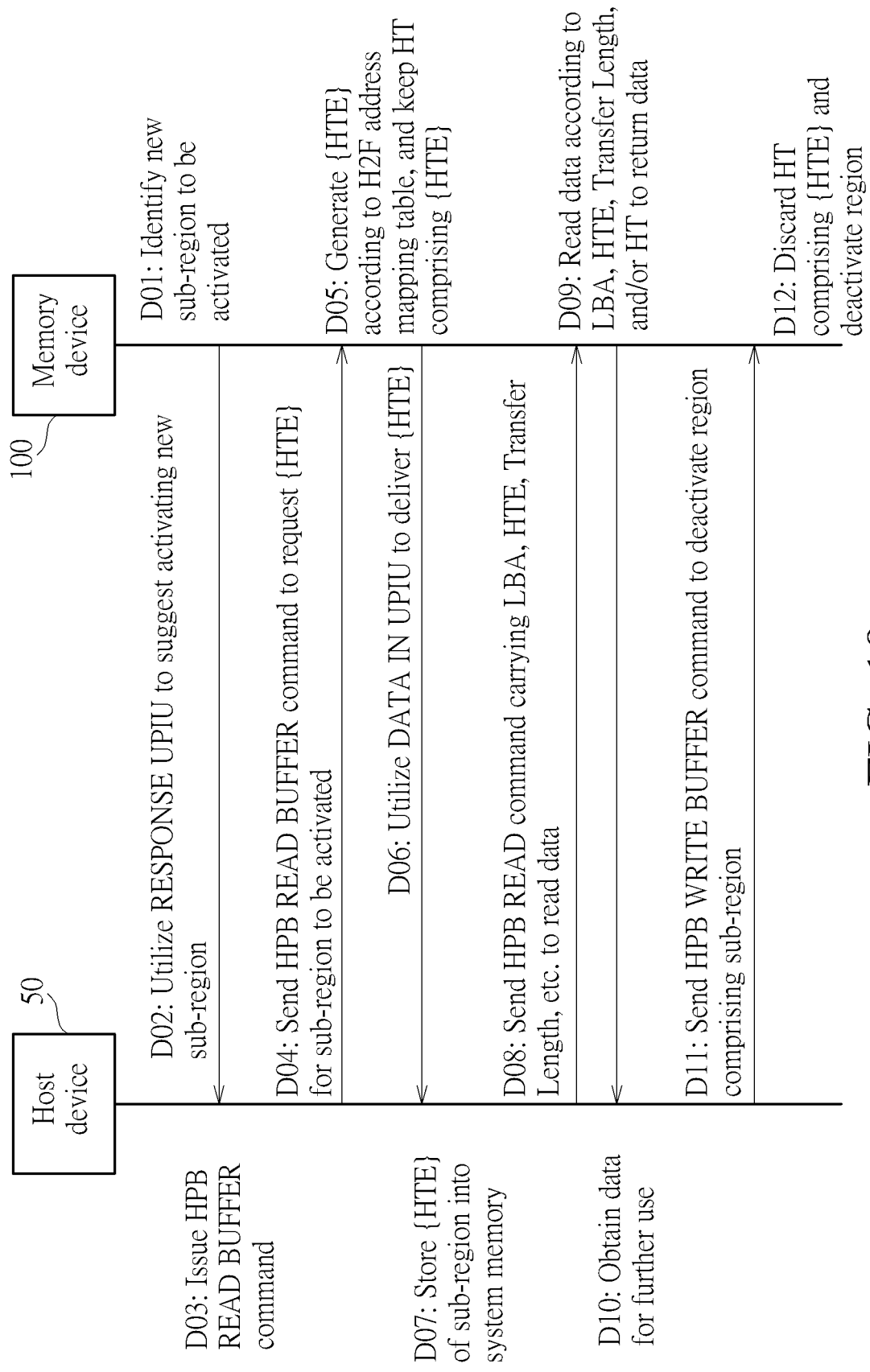
FIG. 10 illustrates a control scheme of a method for performing access management of a memory device such as that shown in FIG. 1 in an HPB architecture with aid of device side table information according to an embodiment of the present invention.

FIG. 10 illustrates a control scheme of a method for performing access management of a memory device such as that shown in FIG. 1 in an HPB architecture with aid of device side table information according to an embodiment of the present invention. For example, the electronic device 10 may operate in the device control mode.

In Step D01, the memory device 100 can be arranged to identify a new sub-region to be activated (e.g. one of the HPB sub-regions 0, 1, ... and (L−1) of one of the HPB regions 0, 1, etc.) when there is a need.

In Step D02, the memory device 100 can be arranged to utilize the RESPONSE UPIU to suggest activating the new sub-region.

In Step D03, the host device 50 can be arranged to issue the HPB READ BUFFER command in response to the suggestion of the memory device 100.

In Step D04, the host device 50 can be arranged to send the HPB READ BUFFER command to request the multiple hybrid table entries {HTE} of the hybrid table HT for the sub-region to be activated.

In Step D05, the memory device 100 can be arranged to generate the multiple hybrid table entries {HTE} (e.g. multiple HPB entries such as that shown in Table 1) according to the aforementioned at least one H2F address mapping table (e.g. the local H2F address mapping table mentioned in the embodiment shown in FIG. 2), and keep the hybrid table HT comprising the multiple hybrid table entries {HTE}, such as an HPB entry table comprising the multiple HPB entries.

In Step D06, the memory device 100 can be arranged to utilize the DATA IN UPIU to deliver the multiple hybrid table entries {HTE} to the host device 50.

In Step D07, the host device 50 can be arranged to store the multiple hybrid table entries {HTE} of this sub-region into the system memory (e.g. the RAM 56).

In Step D08, the host device 50 can be arranged to send the HPB READ command carrying the LBA, the corresponding hybrid table entry HTE, the transfer length, etc. to the memory device 100 to read the data.

In Step D09, the memory device 100 can be arranged to read the data from the NV memory 120 for the host device 50 according to the LBA, the corresponding hybrid table entry HTE, the transfer length, and/or the hybrid table HT, in order to return the data to the host device 50.

In Step D10, the host device 50 can be arranged to obtain the data from the memory device 100 for further use.

In Step D11, the host device 50 can be arranged to send the HPB WRITE BUFFER command to the memory device 100 in order to deactivate the region comprising the sub-region.

In Step D12, the memory device 100 can be arranged to discard the hybrid table HT comprising the multiple hybrid table entries {HTE}, and deactivate the region.

According to this embodiment, the memory device 100 can utilize at least one portion (e.g. a portion or all) of the hybrid table HT as the device side table information, and keep the hybrid table HT until the HPB WRITE BUFFER command is received. For brevity, similar descriptions for this embodiment are not repeated in detail here.

For better comprehension, the method may be illustrated with the operations shown in FIG. 10, but the present invention is not limited thereto. According to some embodiments, one or more steps may be added, deleted, or changed in the operations shown in FIG. 10. For example, in a situation where the electronic device 10 operates in the host control mode, Steps D01 and D02 shown in FIG. 10 may be deleted. For another example, in a situation where the electronic device 10 operates in the host control mode, Steps D01 and D02 shown in FIG. 10 may be replaced by Step A01.

Figure 11:
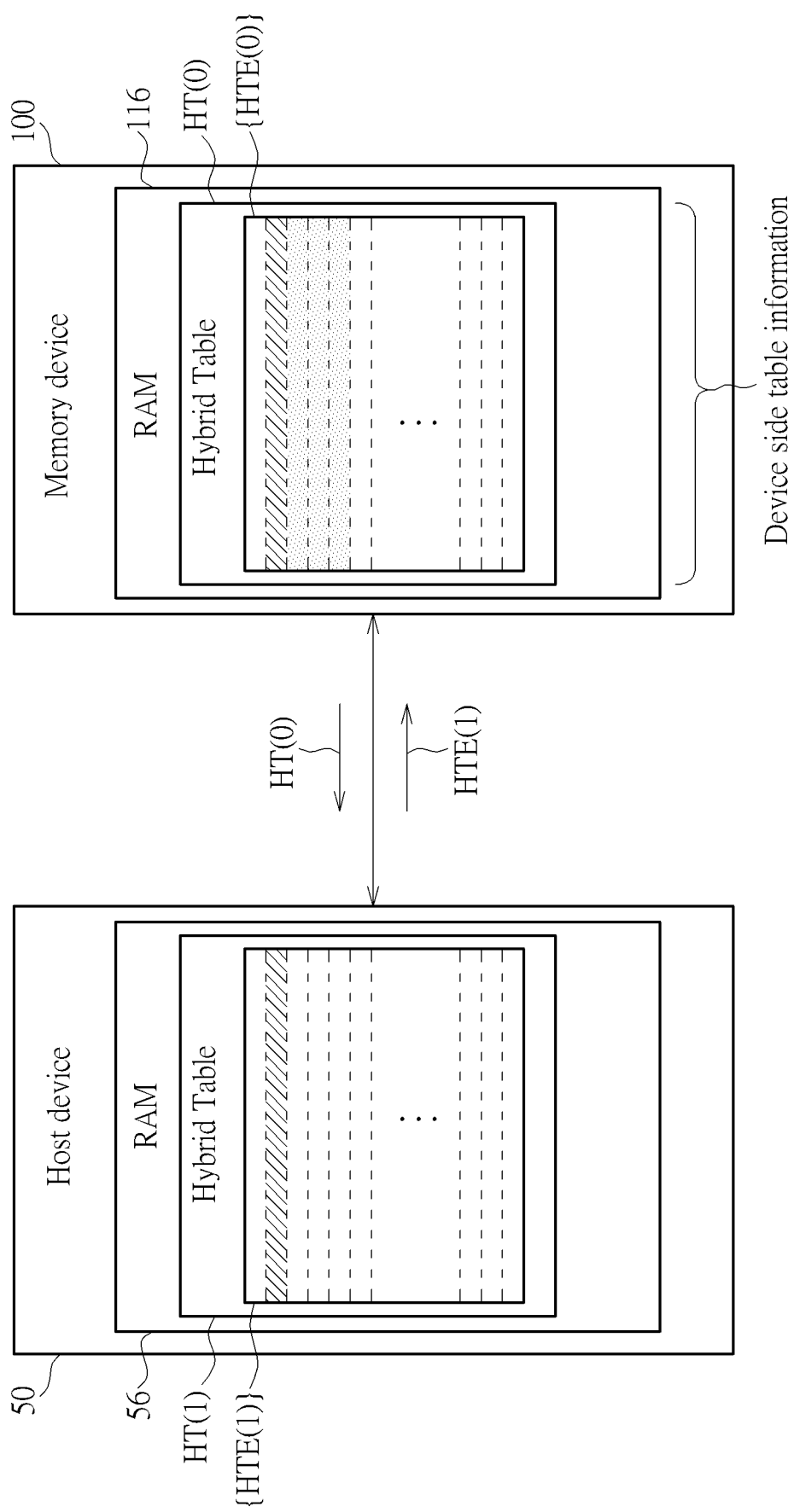
FIG. 11 illustrates an example of the device side table information.

FIG. 11 illustrates an example of the device side table information. As mentioned above, the memory device 100 can keep the hybrid table HT until the HPB WRITE BUFFER command is received. For better comprehension, the hybrid table HT kept by the memory device 100 in Step D05 can be referred to as a device side hybrid table such as the hybrid table HT(0), and the hybrid table HT stored by the host device 50 in Step D07 can be referred to as a host side hybrid table such as the hybrid table HT(1). Similarly, the multiple hybrid table entries {HTE} of the hybrid table HT kept by the memory device 100 in Step D05 can be referred to as device side hybrid table entries such as hybrid table entries {HTE(0)}, and the multiple hybrid table entries {HTE} of the hybrid table HT stored by the host device 50 in Step D07 can be referred to as host side hybrid table entries such as hybrid table entries {HTE(1)}.

For example, when receiving the HPB READ BUFFER command, the memory device 100 can generate the hybrid table HT(0) such as the HPB entry table according to the aforementioned at least one H2F address mapping table (e.g. the local H2F address mapping table mentioned in the embodiment shown in FIG. 2) and send the hybrid table HT(0) to the host device 50, and can maintain the hybrid table HT(0) (e.g. the HPB entry table) in the RAM 116 such as the SRAM to be still marked as valid table information, for keeping the hybrid table HT(0) in the RAM 116.

Regarding the operation of Step D09, when receiving the HPB READ command, the memory device 100 can refer to the hybrid table HT(0) (e.g. the HPB entry table) in the RAM 116 to determine or verify whether the corresponding hybrid table entry HTE(1) (e.g. the HPB entry) carried by the HPB READ command is correct according to whether the corresponding hybrid table entry HTE(1) carried by the HPB READ command (e.g. the table entry TE1 and/or the table entry TE2 of the corresponding hybrid table entry HTE(1)) matches the device side table information. As the ranking of the multiple hybrid table entries {HTE} (e.g. {HTE(0)} or {HTE(1)}) in the hybrid table HT (e.g. HT(0) or HT(1)) correspond to the series of logical addresses, when the LBA is one of the series of logical addresses, the host device 50 can obtain the corresponding hybrid table entry HTE(1) from the hybrid table HT(1) in the system memory (e.g. the RAM 56) according to the LBA, and the memory device 100 can obtain the device side table information such as a device side hybrid table entry HTE(0) from the hybrid table HT(0) in the RAM 116 according to the LBA in a similar way, where the device side hybrid table entry HTE (0) is one of the multiple hybrid table entries {HTE(0)} of the hybrid table HT(0) in the RAM 116, and has the same ranking as that of the corresponding hybrid table entry HTE(1) of the hybrid table HT(1) in the system memory (e.g. the RAM 56).

When the corresponding hybrid table entry HTE(1) is the same as this hybrid table entry HTE(0) of the hybrid table HT(0) kept in the RAM 116, which means the corresponding hybrid table entry HTE(1) is correct, the memory device 100 can read the data according to the corresponding hybrid table entry HTE(1) (e.g. the table entry TE1 thereof). The memory device 100 can determine whether the corresponding hybrid table entry HTE(1) is correct according to whether the table entry TE2 of the corresponding hybrid table entry HTE(1) is equal to the table entry TE2 of the hybrid table entry HTE(0) having the same ranking as that of the corresponding hybrid table entry HTE(1). If the table entry TE2 of the corresponding hybrid table entry HTE(1) is equal to the table entry TE2 of this hybrid table entry HTE(0), the corresponding hybrid table entry HTE(1) is correct; otherwise, the corresponding hybrid table entry HTE(1) is incorrect. For example, it is possible that the host device 50 may have altered the LBA carried by the HPB READ command (which may cause the altered LBA does not match the hybrid table entry HTE(0) such as the HPB entry) or the host device 50 may have modified the table entry TE1 of the corresponding hybrid table entry HTE(1) (e.g. the physical address associated with the starting logical address, such as a physical block address (PBA) associated with the LBA) due to malware, etc. In this situation, the corresponding hybrid table entry HTE(1) is incorrect. When detecting that the corresponding hybrid table entry HTE(1) is incorrect, the memory device 100 can read the data according to the hybrid table entry HTE(0) (e.g. the table entry TE1 thereof).

When the transfer length carried by the HPB READ command is equal to one (e.g. a hexadecimal value such as 0x01 or 01h), the memory device 100 can be configured to read the data according to the table entry TE1 (e.g. the PBA) of the hybrid table entry HTE(1) in a situation where the hybrid table entry HTE(1) is correct, or read the data according to the table entry TE1 (e.g. the PBA) of the hybrid table entry HTE(0) no matter whether the hybrid table entry HTE(1) is correct. In addition, when the transfer length carried by the HPB READ command is greater than one, the memory device 100 can read the beginning portion of the data according to the table entry TE1 (e.g. the PBA) of the hybrid table entry HTE (e.g. the hybrid table entry HTE(0); or the hybrid table entry HTE(1), if it is correct) and read at least one remaining portion of the data according to at least one table entry TE1 (e.g. at least one PBA) of at least one subsequent hybrid table entry coming after the hybrid table entry HTE(0) among the hybrid table entries {HTE(0)}.

For better comprehension, assume that the heavily shaded portion of the hybrid table entries {HTE(1)} as shown in the left half of FIG. 11 may represent the hybrid table entry HTE(1) selected by the host device 50 according to the LBA. In this situation, the heavily shaded portion and the lightly shaded portions of the hybrid table entries {HTE(0)} as shown in the right half of FIG. 11 may represent the hybrid table entry HTE(0) and the aforementioned at least one subsequent hybrid table entry that are selected by the memory device 100, respectively, where the total number of the shaded portions of the hybrid table entries {HTE(0)} may indicate that the transfer length carried by the HPB READ command is equal to four (e.g. (1+3)=4), but the present invention is not limited thereto. In addition, the HPB entries {0, 1, . . . } of Table 1 can be taken as examples of the multiple hybrid table entries {HTE} (e.g. {HTE(0)} or {HTE(1)}). Thus, each of the hybrid table entry HTE(1) and the hybrid table entry HTE(0) may comprise the HPB entry 1 of Table 1 (e.g. the table contents {0x00004030, 0x0000A001}), where the aforementioned at least one subsequent hybrid table entry may comprise the HPB entries {2, 3, 4} (e.g. the table contents {{0x00004030, 0x0000A002}, {0x00004030, 0x0000A003}, {0x00004030, 0x0000A004}}), respectively. For brevity, similar descriptions for this embodiment are not repeated in detail here.

Figure 12:
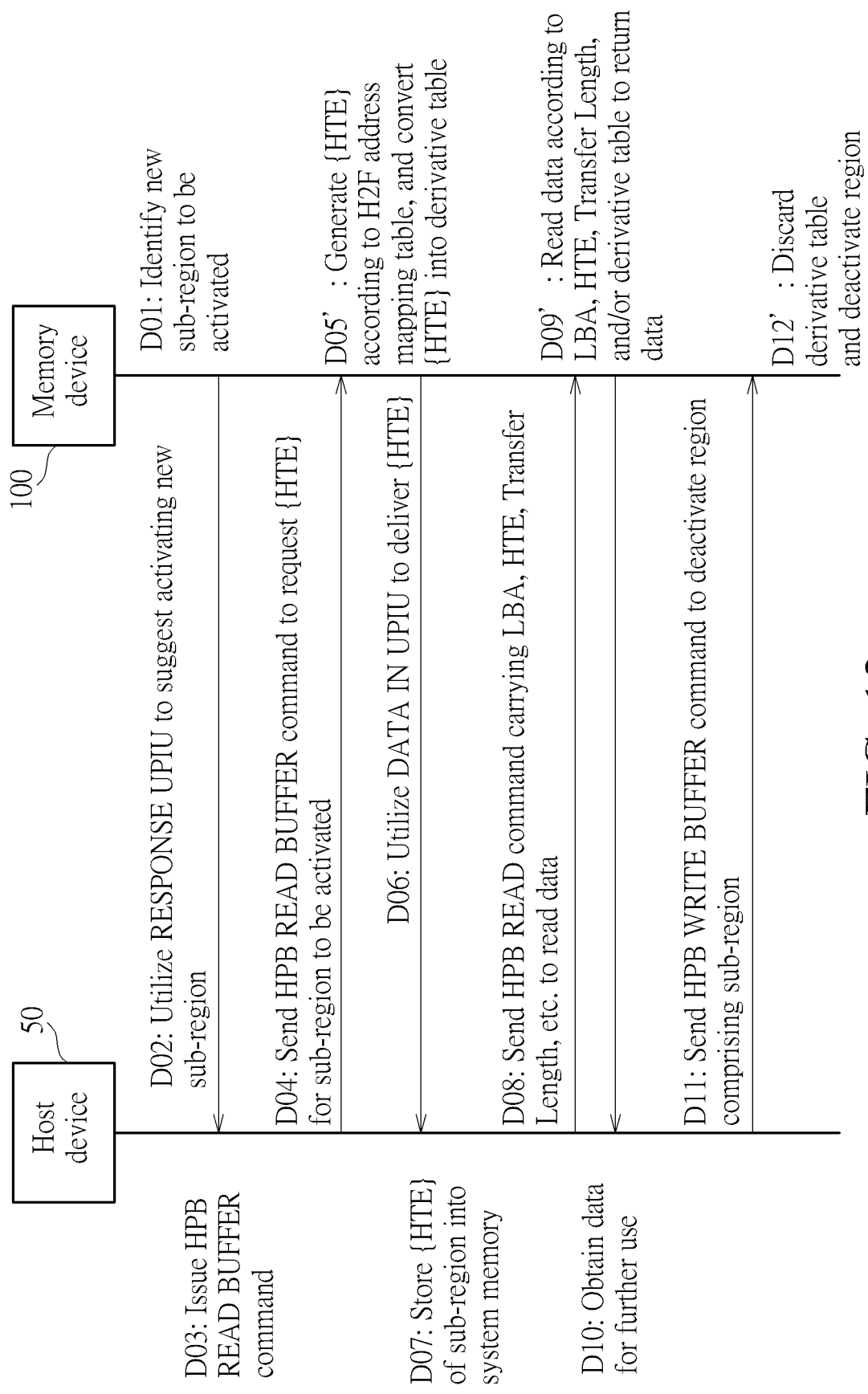
FIG. 12 illustrates a control scheme of the method for performing access management of the memory device in the HPB architecture with aid of the device side table information according to another embodiment of the present invention.

FIG. 12 illustrates a control scheme of the method for performing access management of the memory device in the HPB architecture with aid of the device side table information according to another embodiment of the present invention. For example, the electronic device 10 may operate in the device control mode. In addition, the operations of Steps D0-D04, D06-D08, D10 and D11 of this embodiment can be the same as that of the embodiment shown in FIG. 10, where Steps D05', D09' and D12' respectively replace Steps D05, D09 and D12 described above.

In Step D05', the memory device 100 can be arranged to generate the multiple hybrid table entries {HTE} according to the aforementioned at least one H2F address mapping table (e.g. the local H2F address mapping table mentioned in the embodiment shown in FIG. 2), for being delivered to the host device 50, and convert the multiple hybrid table entries {HTE} into at least one derivative table (e.g. the one or more derivative tables) of the hybrid table HT comprising the multiple hybrid table entries {HTE}, for enhancing reading performance. The aforementioned at least one derivative table of the hybrid table HT can be taken as an example of the aforementioned at least one device side table within the RAM 116.

In Step D09', the memory device 100 can be arranged to read the data from the NV memory 120 for the host device 50 according to the LBA, the corresponding hybrid table entry HTE, the transfer length, and/or the aforementioned at least one derivative table of the hybrid table HT, in order to return the data to the host device 50.

In Step D12', the memory device 100 can be arranged to discard the aforementioned at least one derivative table, and deactivate the region.

According to this embodiment, the memory device 100 can utilize at least one portion (e.g. a portion or all) of the aforementioned at least one derivative table of the hybrid table HT as the device side table information, and keep the aforementioned at least one derivative table of the hybrid table HT until the HPB WRITE BUFFER command is received. For brevity, similar descriptions for this embodiment are not repeated in detail here.

For better comprehension, the method may be illustrated with the operations shown in FIG. 12, but the present invention is not limited thereto. According to some embodiments, one or more steps may be added, deleted, or changed in the operations shown in FIG. 12. For example, in a situation where the electronic device 10 operates in the host control mode, Steps D01 and D02 shown in FIG. 12 may be deleted. For another example, in a situation where the electronic device 10 operates in the host control mode, Steps D01 and D02 shown in FIG. 12 may be replaced by Step A01.

According to some embodiments, the memory device 100 can utilize at least one portion (e.g. a portion or all) of the hybrid table HT (e.g. the hybrid table HT(0) shown in FIG. 11) and at least one portion (e.g. a portion or all) of the aforementioned at least one derivative table of the hybrid table HT as the device side table information, and keep the hybrid table HT (e.g. the hybrid table HT(0) shown in FIG. 11) and the aforementioned at least one derivative table of the hybrid table HT until the HPB WRITE BUFFER command is received.

Figure 13:
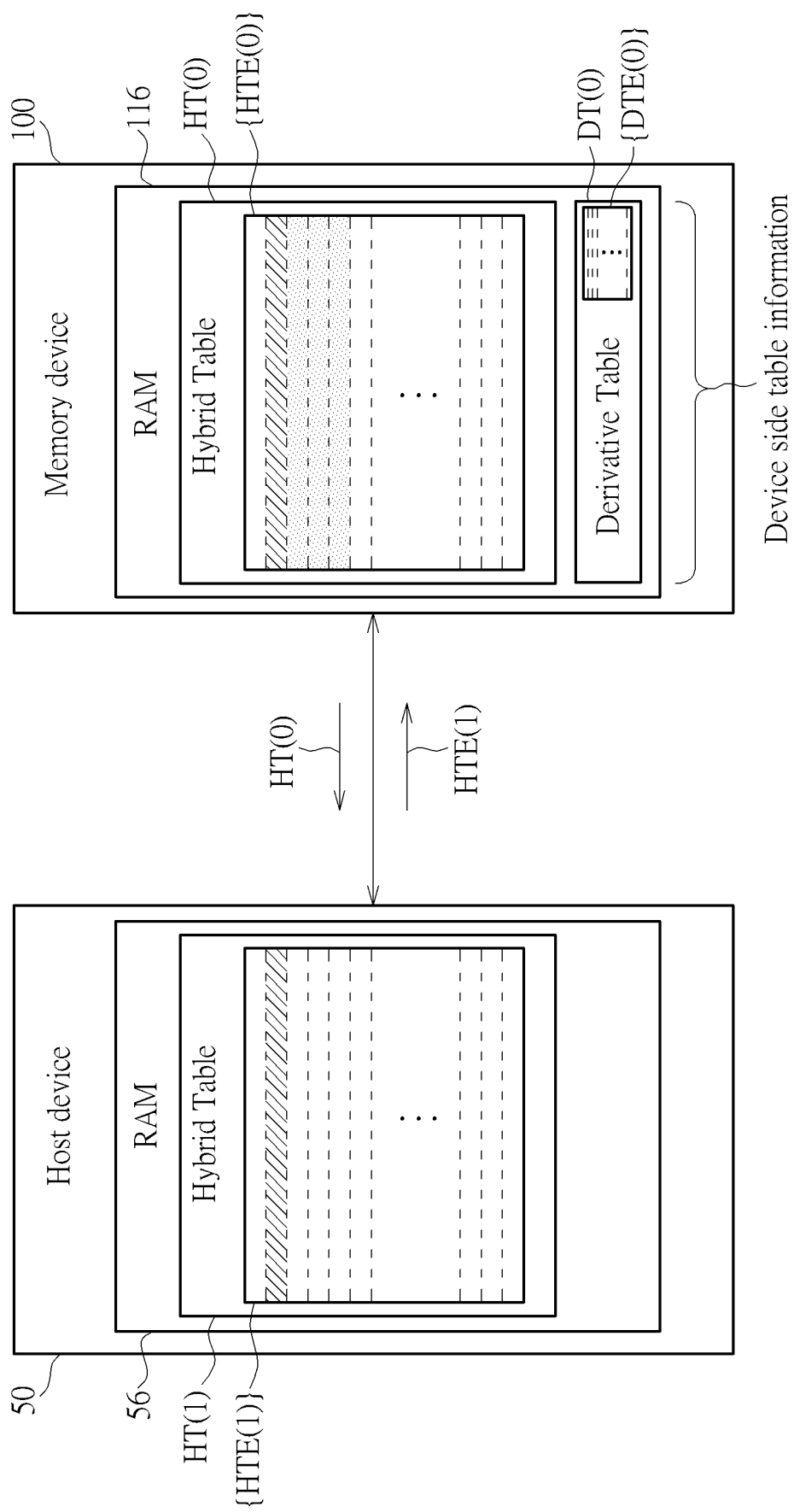
FIG. 13 illustrates another example of the device side table information.

FIG. 13 illustrates another example of the device side table information. For better comprehension, the aforementioned at least one derivative table kept by the memory device 100 in Step D05' can be referred to as the derivative table DT(0). The memory device 100 can keep the hybrid table HT(0) and the derivative table DT(0) until the HPB WRITE BUFFER command is received. For example, when receiving the HPB READ BUFFER command, the memory device 100 can generate the hybrid table HT(0) such as the HPB entry table according to the aforementioned at least one H2F address mapping table (e.g. the local H2F address mapping table mentioned in the embodiment shown in FIG. 2) and send the hybrid table HT(0) to the host device 50, and can maintain the hybrid table HT(0) (e.g. the HPB entry table) and the derivative table DT(0) in the RAM 116 such as the SRAM to be still marked as valid table information, for keeping the hybrid table HT(0) and the derivative table DT(0) in the RAM 116.

Regarding the operation of Step D09', when receiving the HPB READ command, the memory device 100 can refer to the hybrid table HT(0) (e.g. the HPB entry table) in the RAM 116 to determine or verify whether the corresponding hybrid table entry HTE(1) (e.g. the HPB entry) carried by the HPB READ command is correct according to whether the corresponding hybrid table entry HTE(1) carried by the HPB READ command (e.g. the table entry TE1 and/or the table entry TE2 of the corresponding hybrid table entry HTE(1)) matches the device side table information, where implementation details of determining or verifying whether the corresponding hybrid table entry HTE(1) (e.g. the HPB entry) carried by the HPB READ command is correct can be the same as that of the embodiment shown in FIG. 11. When the transfer length carried by the HPB READ command is equal to one, the memory device 100 can be configured to read the data according to the table entry TE1 (e.g. the PBA) of the hybrid table entry HTE(1) in a situation where the hybrid table entry HTE(1) is correct, or read the data according to the table entry TE1 (e.g. the PBA) of the hybrid table entry HTE(0) no matter whether the hybrid table entry HTE(1) is correct. In addition, when the transfer length carried by the HPB READ command is greater than one, the memory device 100 can read the beginning portion of the data according to the table entry TE1 (e.g. the PBA) of the hybrid table entry HTE (e.g. the hybrid table entry HTE(0); or the hybrid table entry HTE(1), if it is correct) and read at least one remaining portion of the data according to at least one derivative table entry of the derivative table DT(0), where the aforementioned at least one derivative table entry of the derivative table DT(0) may indicate continuity of at least one table entry TE1 (e.g. at least one PBA) of at least one subsequent hybrid table entry coming after the hybrid table entry HTE(0) among the hybrid table entries {HTE(0)}, where the continuity may represent at least one continuity status of the aforementioned at least one table entry TE1, such as the status of continuity with respect to the table entry TE1 of the first hybrid table entry of the hybrid table entries {HTE(0)}.

For better comprehension, assume that the heavily shaded portion of the hybrid table entries {HTE(1)} as shown in the left half of FIG. 13 may represent the hybrid table entry HTE(1) selected by the host device 50 according to the LBA. In this situation, the heavily shaded portion and the lightly shaded portions of the hybrid table entries {HTE(0)} as shown in the right half of FIG. 13 may represent the hybrid table entry HTE(0) that is selected by the memory device 100 and the aforementioned at least one subsequent hybrid table entry (whose at least one table entry TE1 such as at least one PBA is indicated by the aforementioned at least one derivative table entry of the derivative table DT(0)), respectively, where the total number of the shaded portions of the hybrid table entries {HTE(0)} may indicate that the transfer length carried by the HPB READ command is equal to four (e.g. (1+3)=4), but the present invention is not limited thereto. In addition, the HPB entries {0, 1, . . . } of Table 1 can be taken as examples of the multiple hybrid table entries {HTE} (e.g. {HTE(0)} or {HTE(1)}). Thus, each of the hybrid table entry HTE(1) and the hybrid table entry HTE(0) may comprise the HPB entry 1 of Table 1 (e.g. the table contents {0x00004030, 0x0000A001}), and the aforementioned at least one subsequent hybrid table entry may comprise the HPB entries {2, 3, 4} of Table 1 (e.g. the table contents {{0x00004030, 0x0000A002}, {0x00004030, 0x0000A003}, {0x00004030, 0x0000A004}}), respectively. For brevity, similar descriptions for this embodiment are not repeated in detail here.

TABLE 2

| HPB entry | T2 Content | T1 Content |
| --- | --- | --- |
| 0 | 0x00004030 | 0x0000A000 |
| 1 | 0x00004030 | 0x0000A001 |
| 2 | 0x00004030 | 0x0000A002 |
| 3 | 0x00004030 | 0x0000A009 |
| 4 | 0x00004030 | 0x0000A004 |
| 5 | 0x00004030 | 0x0000A005 |
| 6 | 0x00004030 | 0x0000B00A |
| 7 | 0x00004030 | 0x0000A007 |
| . . . | . . . | . . . |

Table 2 illustrates another example of the hybrid table HT, where the notation " . . . " indicates that some table contents may be omitted for brevity. The HPB entries {0, 1, . . . } of Table 2 may represent the multiple hybrid table entries {HTE} (e.g. {HTE(0)} or {HTE(1)}). In addition, the T1 and T2 contents (e.g. hexadecimal values) of Table 2 may represent the contents of the tables T1 and T2 (e.g. the respective table entries {TE1} and {TE2} of the tables T1 and T2), respectively. The physical addresses {0x0000A000, 0x0000A001, 0x0000A002, 0x0000A009, 0x0000A004, 0x0000A005, 0x0000B00A, 0x0000A007, . . . } that appear in the T1 contents may be taken as examples of the associated physical addresses corresponding to the series of logical addresses, and the physical address 0x00004030 that repeatedly appears to be the physical addresses {0x00004030, 0x00004030, . . . } in the T2 contents may be taken as an example of the physical address of the local H2F address mapping table.

TABLE 3

| DT entry | Continuity |
| --- | --- |
| 0 | 0 |
| 1 | 0 |
| 2 | 0 |
| 3 | 1 |
| 4 | 0 |
| 5 | 0 |
| 6 | 1 |
| 7 | 0 |
| . . . | . . . |

Table 3 illustrates an example of the derivative table DT(0), where the notation " . . . " indicates that some table contents may be omitted for brevity. The derivative table (DT) entries {0, 1, . . . } of Table 3 may represent multiple derivative table entries {DTE(0)} of the derivative table DT(0), where the multiple derivative table entries {DTE(0)} correspond to the multiple hybrid table entries {HTE} (e.g. {HTE(0)} or {HTE(1)}), respectively, and more particularly, indicate continuity of the table entries {TE1} (e.g. PBAs) of the multiple hybrid table entries {HTE} (e.g. {HTE(0)} or {HTE(1)}) with respect to the beginning entry of the table entries {TE1}, respectively. For example, the physical addresses {0x0000A000, 0x0000A001, 0x0000A002, 0x0000A009, 0x0000A004, 0x0000A005, 0x0000B00A, 0x0000A007, . . . } that appear in the T1 contents of Table 2 can be regarded as a series of continuous physical addresses except some discontinuities (e.g. break points) such as 0x0000A009, 0x0000B00A, etc., and the multiple derivative table entries {DTE(0)} of the derivative table DT(0), such as the Continuity bits {0, 0, 0, 1, 0, 0, 1, 0, . . . }, can be utilized for indicating the continuities (e.g. non-break points) such as 0x0000A000, 0x0000A001, 0x0000A002, 0x0000A004, 0x0000A005, 0x0000A007, etc. with respect to the first physical address 0x0000A000 and the discontinuities (e.g. the break points) such as 0x0000A009, 0x0000B00A, etc. with respect to the first physical address 0x0000A000, but the present invention is not limited thereto. According to some embodiments, the Continuity bits {0, 0, 0, 1, 0, 0, 1, 0, . . . } can be replaced with an inverted version thereof. According to some embodiments, the first table entry of the multiple derivative table entries {DTE(0)}, such as the first Continuity bit 0 of the Continuity bits {0, 0, 0, 1, 0, 0, 1, 0, . . . }, can be omitted.

According to some embodiments, the HPB entries {0, 1, . . . } of Table 2 and the DT entries {0, 1, . . . } of Table 3 can be taken as examples of the multiple hybrid table entries {HTE} (e.g. {HTE(0)} or {HTE(1)}) and the multiple derivative table entries {DTE(0)} of the derivative table DT(0), respectively. For better comprehension, assume that the heavily shaded portion of the hybrid table entries {HTE(1)} as shown in the left half of FIG. 13 may represent the hybrid table entry HTE(1) selected by the host device 50 according to the LBA. In this situation, the heavily shaded portion and the lightly shaded portions of the hybrid table entries {HTE(0)} as shown in the right half of FIG. 13 may represent the hybrid table entry HTE(0) that is selected by the memory device 100 and the aforementioned at least one subsequent hybrid table entry (whose at least one table entry TE1 such as at least one PBA is indicated by the aforementioned at least one derivative table entry of the derivative table DT(0)), respectively, where the total number of the shaded portions of the hybrid table entries {HTE(0)} may indicate that the transfer length carried by the HPB READ command is equal to four (e.g. (1+3)=4), but the present invention is not limited thereto. In addition, the HPB entries {0, 1, . . . } of Table 2 can be taken as examples of the multiple hybrid table entries {HTE} (e.g. {HTE(0)} or {HTE(1)}). Thus, each of the hybrid table entry HTE(1) and the hybrid table entry HTE(0) may comprise the HPB entry 1 of Table 2 (e.g. the table contents {0x00004030, 0x0000A001}), and the aforementioned at least one subsequent hybrid table entry may comprise the HPB entries {2, 3, 4} of Table 2 (e.g. the table contents {{0x00004030, 0x0000A002}, {0x00004030, 0x0000A009}, {0x00004030, 0x0000A004}}), respectively, where the aforementioned at least one derivative table entry of the derivative table DT(0) may comprise the DT entries {2, 3, 4} of Table 3.

As the aforementioned at least one derivative table entry of the derivative table DT(0), such as the DT entries {2, 3, 4} of Table 3, may indicate the continuity of the respective physical addresses {0x0000A002, 0x0000A009, 0x0000A004}) of the subsequent HPB entries {2, 3, 4} coming after the HPB entry 1 with respect to the physical address 0x0000A000 of the HPB entry 0 among the HPB entries {0, 1, . . . } of Table 2, the memory device 100 can read continuous data at the physical addresses 0x0000A001-0x0000A004, starting from the physical address 0x0000A001, and read a segment of discontinuous data (e.g. break point data, such as valid data of a break point) at the physical address 0x0000A009, and replace invalid data at the physical address 0x0000A003 among the continuous data at the physical addresses 0x0000A001-0x0000A004 with the segment of discontinuous data at the physical address 0x0000A009 to generate the data corresponding to the reading request (e.g. the HPB READ command), and then return the data corresponding to the reading request to the host device 50. For brevity, similar descriptions for these embodiments are not repeated in detail here.

According to some embodiments, assume that the data corresponding to the reading request (e.g. the HPB READ command) is the continuous data at 0x0000A000-0x0000A002. In this situation, as all of the continuous data at the physical addresses 0x0000A000-0x0000A002 is valid data, the memory device 100 can directly read the continuous data at the physical addresses 0x0000A000-0x0000A002, starting from the physical address 0x0000A000, to generate the data corresponding to the reading request, having no need to read any segment of discontinuous data and replace any invalid data. Afterward, the memory device 100 can return the data corresponding to the reading request to the host device 50. For brevity, similar descriptions for these embodiments are not repeated in detail here.

TABLE 4

| DT entry | Continuity |
| --- | --- |
| 0 | 1 |
| 1 | 1 |
| 2 | 1 |
| 3 | 0 |
| 4 | 1 |
| 5 | 1 |
| 6 | 0 |
| 7 | 1 |
| . . . | . . . |

Table 4 illustrates another example of the derivative table DT(0), where the notation " . . . " indicates that some table contents may be omitted for brevity. The derivative table (DT) entries {0, 1, . . . } of Table 4 may represent the multiple derivative table entries {DTE(0)} of the derivative table DT(0). The Continuity bits {1, 1, 1, 0, 1, 1, 0, 1, . . . } shown in Table 4 can be taken as an example of the inverted version of the Continuity bits {0, 0, 0, 1, 0, 0, 1, 0, . . . } shown in Table 3. For brevity, similar descriptions for this embodiment are not repeated in detail here.

Figure 14:
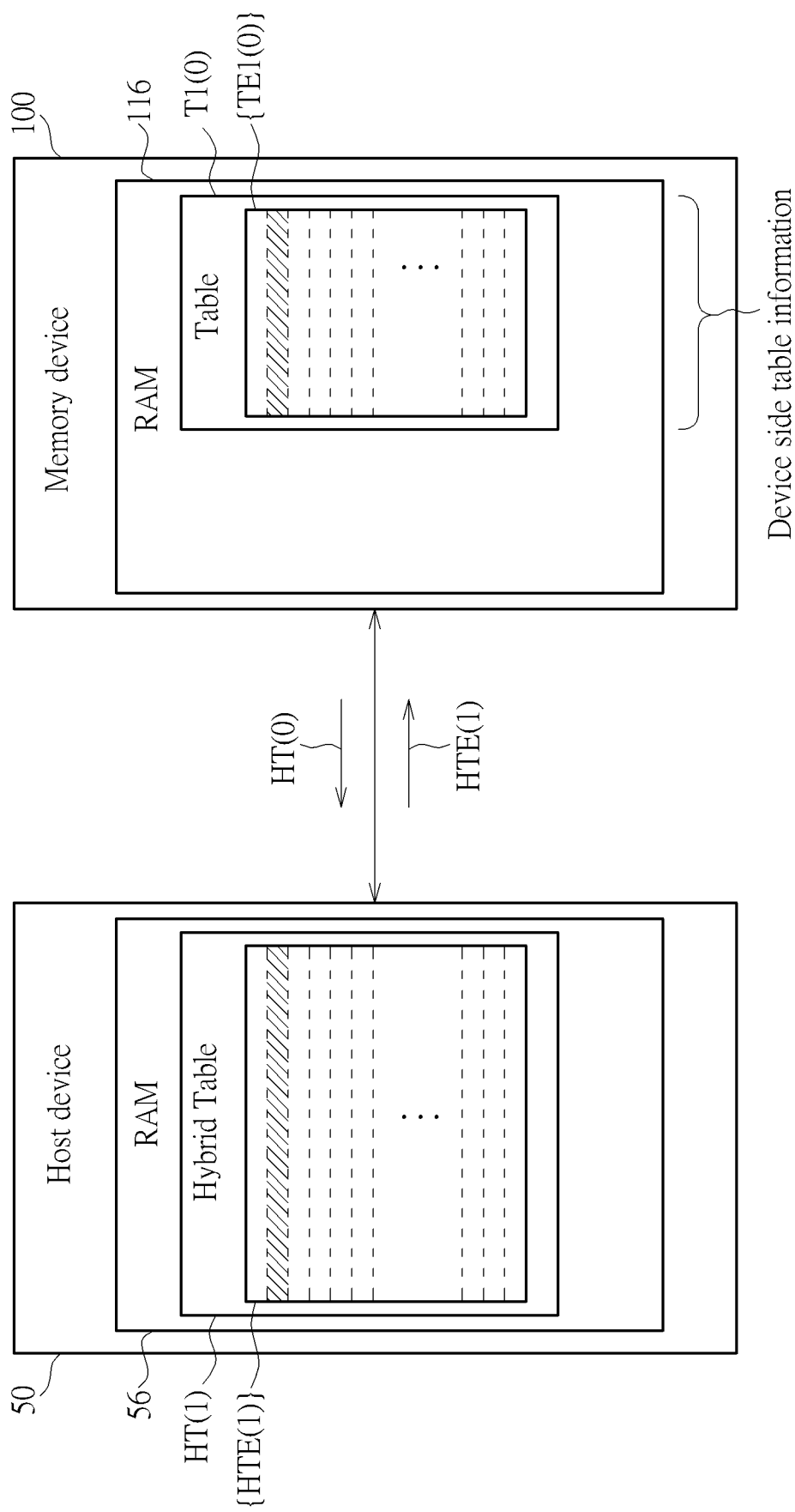
FIG. 14 illustrates another example of the device side table information.

FIG. 14 illustrates another example of the device side table information. The memory device 100 can discard the table T2 in the hybrid table entry HT(0) and keep the table T1 in the hybrid table entry HT(0), to generate the table T1(0) comprising the table entries {TE1(0)}, where the table T1(0) can be regarded as a compressed version of the hybrid table entry HT(0) and can be taken as an example of the aforementioned at least one derivative table of the hybrid table HT. The memory device 100 can directly read the data according to the table T1(0) to generate the data corresponding to the reading request. For brevity, similar descriptions for this embodiment are not repeated in detail here.

TABLE 5

| HPB entry | T1 Content |
| --- | --- |
| 0 | 0x0000A000 |
| 1 | 0x0000A001 |
| 2 | 0x0000A002 |
| 3 | 0x0000A009 |
| 4 | 0x0000A004 |
| 5 | 0x0000A005 |
| 6 | 0x0000B00A |
| 7 | 0x0000A007 |
| . . . | . . . |

Table 5 illustrates an example of the table T1(0), where the notation " . . . " indicates that some table contents may be omitted for brevity. The HPB entries {0, 1, . . . } of Table 5 may represent the multiple table entries {TE1(0)}. In addition, the T1 contents (e.g. hexadecimal values) of Table 5 may represent the contents of the table T1(0) (e.g. the table entries {TE1(0)} of the table T1(0)). The physical addresses {0x0000A000, 0x0000A001, 0x0000A002, 0x0000A009, 0x0000A004, 0x0000A005, 0x0000B00A, 0x0000A007, . . . } that appear in the T1 contents may be taken as examples of the associated physical addresses corresponding to the series of logical addresses. For brevity, similar descriptions for this embodiment are not repeated in detail here.

Figure 15:
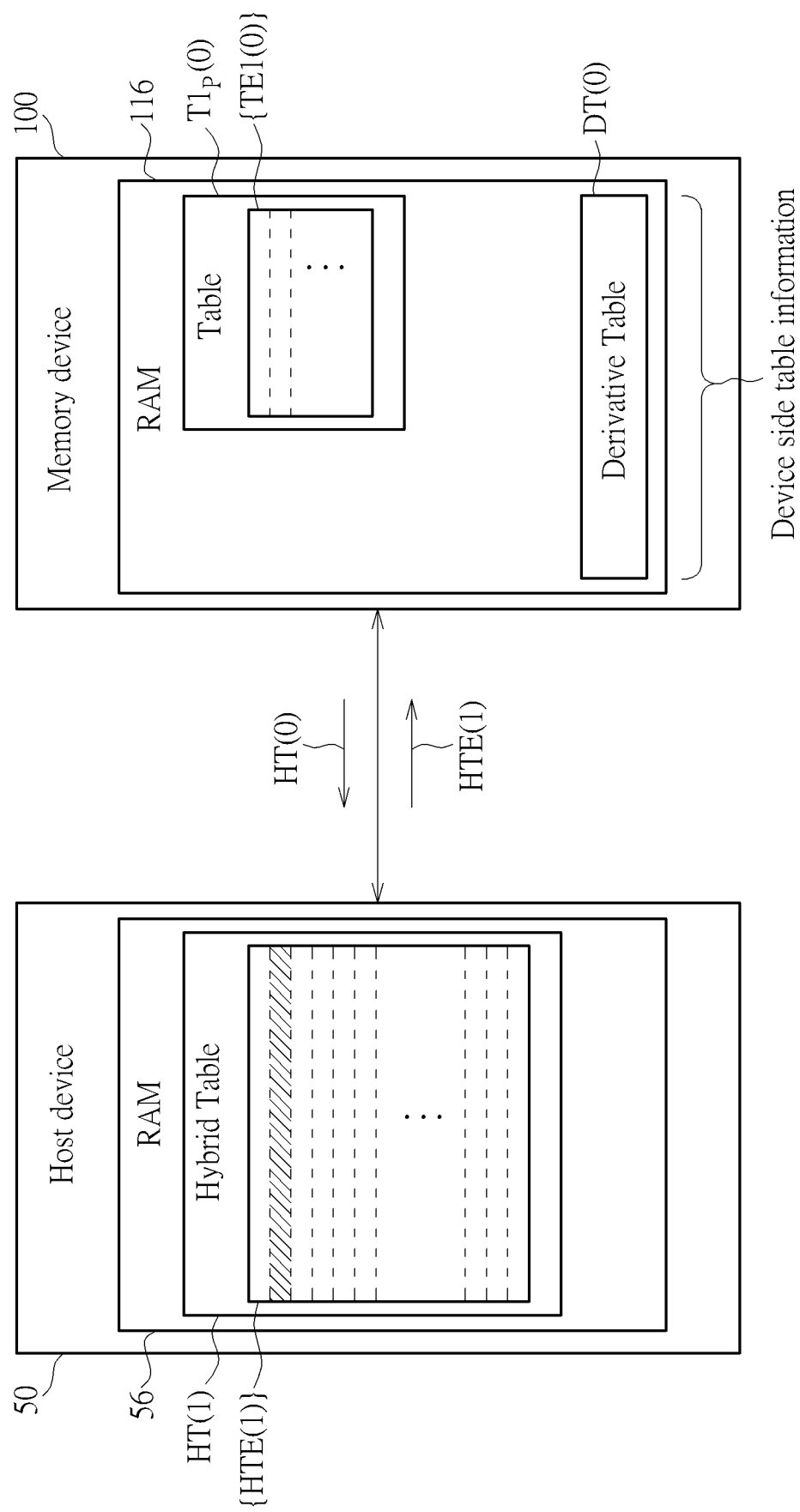
FIG. 15 illustrates another example of the device side table information.

FIG. 15 illustrates another example of the device side table information. The memory device 100 can generate the table T1(0) comprising the table entries {TE1(0)} as mentioned above, and further compress the table T1(0) by discarding one or more table entries corresponding to one or more continuities (e.g. one or more non-break points) indicated by the derivative table DT(0) and keeping one or more table entries corresponding to one or more discontinuities (e.g. one or more break points) indicated by the derivative table DT(0), to generate the table $T1_P(0)$ comprising the remaining table entries {TE1(0)}, where the table $T1_P(0)$ can be regarded as a compressed version of the hybrid table entry HT(0) and can be taken as an example of the aforementioned at least one derivative table of the hybrid table HT. The memory device 100 can read the data according to the table $T1_P(0)$ and the derivative table DT(0) to generate the data corresponding to the reading request. For brevity, similar descriptions for this embodiment are not repeated in detail here.

TABLE 6

| HPB entry | T1 Content |
| --- | --- |
| 0 | 0x0000A000 |
| 3 | 0x0000A009 |
| 6 | 0x0000B00A |
| . . . | . . . |

Table 6 illustrates an example of the table $T1_P(0)$, where the notation " . . . " indicates that some table contents may be omitted for brevity. The HPB entries {0, 3, 6, . . . } of Table 6 may comprise the HPB entries {0, 3, 6, . . . } corresponding to the discontinuities (e.g. the break points) among the HPB entries {0, 1, . . . } of Table 5, such as the T1 content (e.g. 0x0000A000) of the HPB entry 0 and the T1 contents (e.g. {0x0000A009, 0x0000B00A, . . . }) of the HPB entries {3, 6, . . . } corresponding to the discontinuities indicated by the derivative table DT(0) (e.g. Table 3 or Table 4), and may represent the remaining table entries {TE1(0)} in the table $T1_P(0)$. For brevity, similar descriptions for this embodiment are not repeated in detail here.

Figure 16:
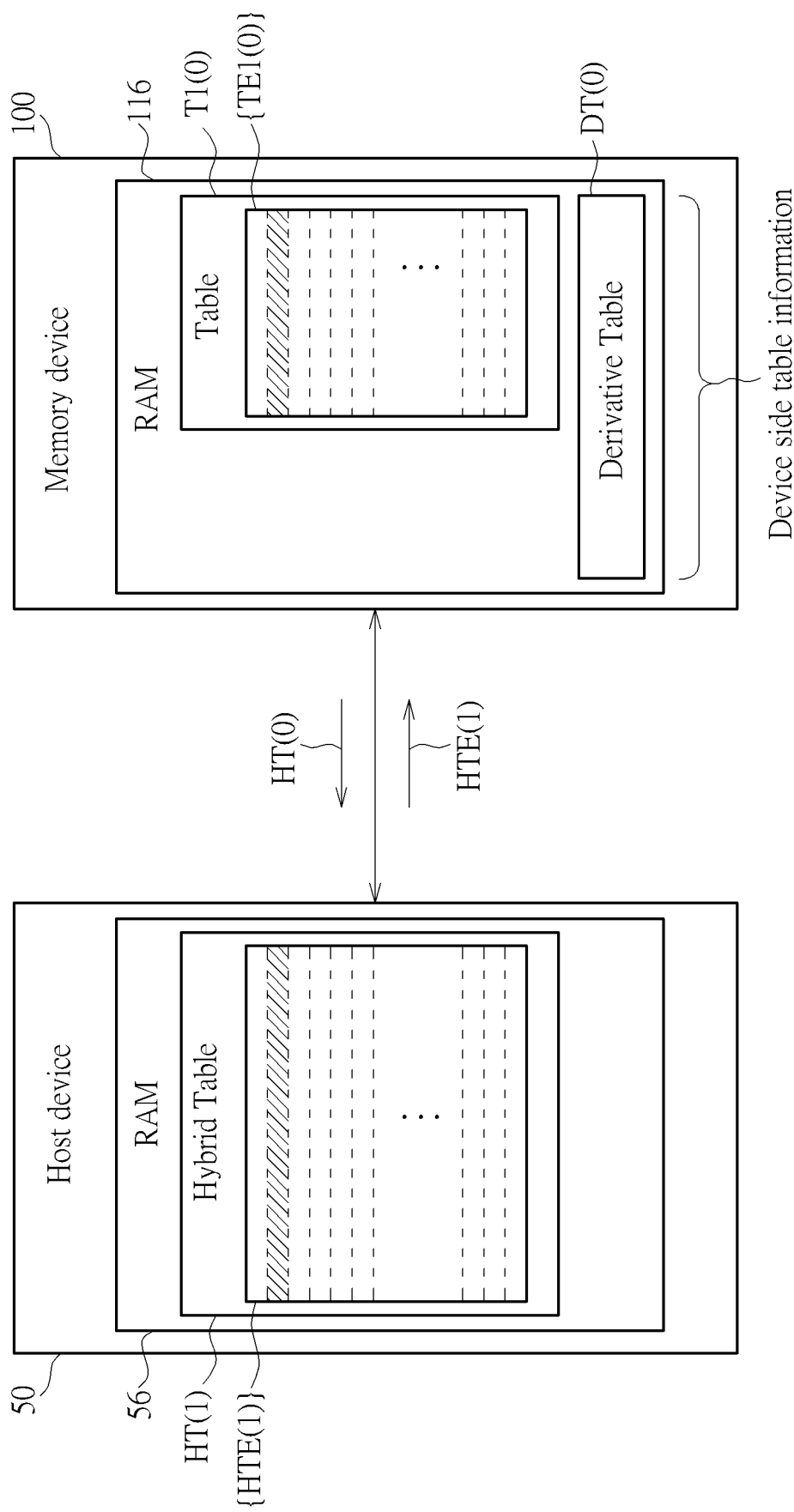
FIG. 16 illustrates another example of the device side table information.

FIG. 16 illustrates another example of the device side table information. The memory device 100 can generate the table T1(0) comprising the table entries {TE1(0)} as mentioned above. In addition, the memory device 100 can read the data according to the table T1(0) and the derivative table DT(0) to generate the data corresponding to the reading request. For brevity, similar descriptions for this embodiment are not repeated in detail here.

Figure 17:
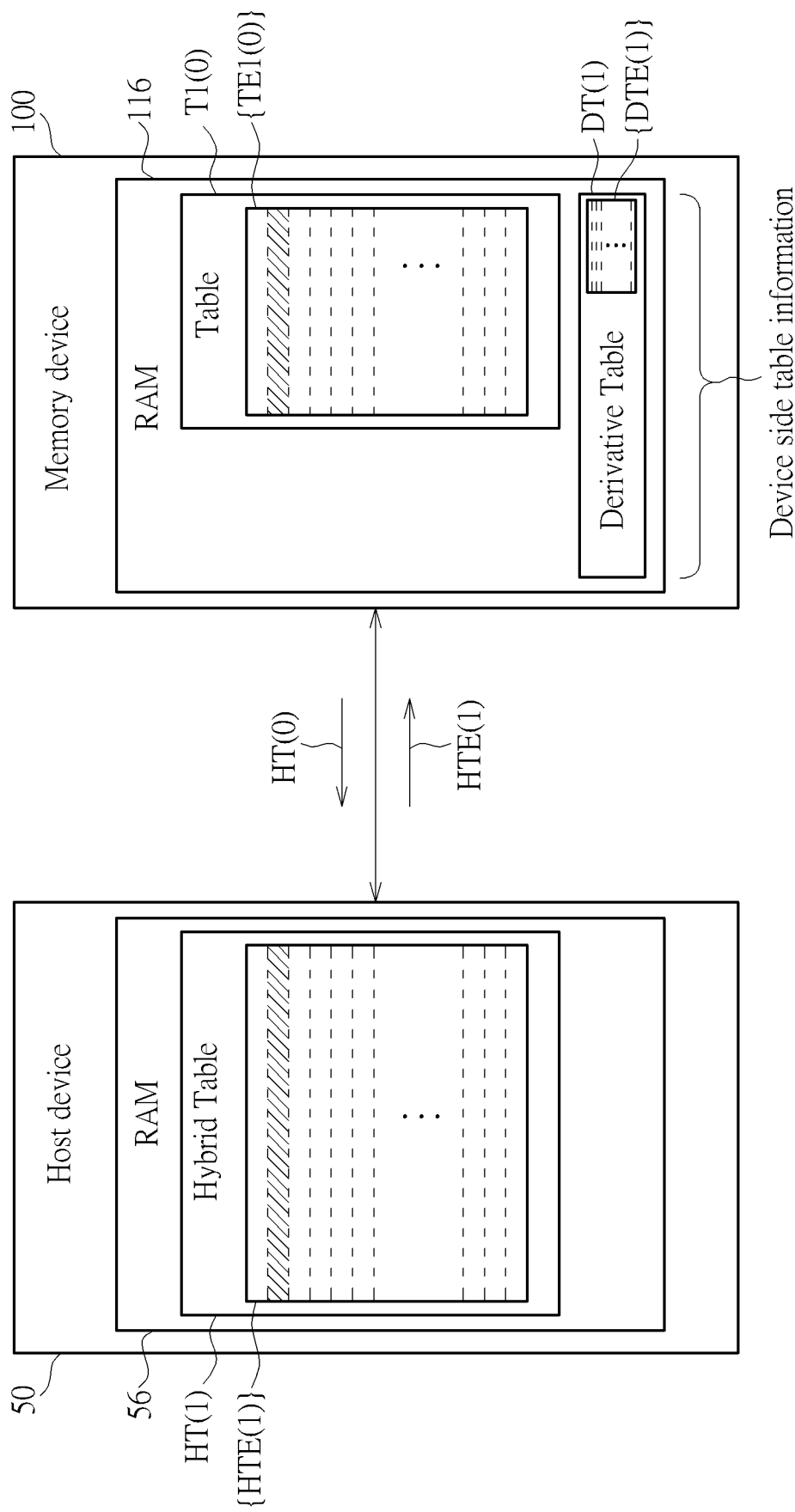
FIG. 17 illustrates another example of the device side table information.

FIG. 17 illustrates another example of the device side table information. The memory device 100 can generate the table T1(0) comprising the table entries {TE1(0)} as mentioned above. In addition, the memory device 100 can read the data according to the table T1(0) and another derivative table DT(1) of the hybrid table HT(0) to generate the data corresponding to the reading request, where the derivative table DT(1) comprising multiple derivative table entries {DTE(1)} replaces the derivative table DT(0) comprising the multiple derivative table entries {DTE(0)}, and can be taken as an example of the aforementioned at least one derivative table of the hybrid table HT. For example, each of the multiple derivative table entries {DTE(1)} of the derivative table DT(1) may comprise more than one bit to carry more continuity information, and the more continuity information may comprise continuity information (e.g. continuity or discontinuity) of more than one table entry TE1(0) of the hybrid table entries {TE1(0)}. For brevity, similar descriptions for this embodiment are not repeated in detail here.

TABLE 7

| DT entry | Continuous Address Length |
| --- | --- |
| 0 | 0x2 |
| 1 | 0x1 |
| 2 | 0x0 |
| 3 | 0x0 |
| 4 | 0x1 |
| 5 | 0x0 |
| 6 | 0x0 |
| 7 | . . . |
| . . . | . . . |

Table 7 illustrates an example of the derivative table DT(1), where the notation " . . . " indicates that some table contents may be omitted for brevity. The derivative table (DT) entries {0, 1, . . . } of Table 7 may represent the multiple derivative table entries {DTE(1)} of the derivative table DT(1), where the multiple derivative table entries {DTE(1)} correspond to the multiple hybrid table entries {HTE} (e.g. {HTE(0)} or {HTE(1)}), respectively, and more particularly, indicate continuity information regarding the table entries {TE1} (e.g. PBAs) of the multiple hybrid table entries {HTE} (e.g. {HTE(0)} or {HTE(1)}), such as continuous address lengths with respect to the table entries {TE1(0)} (e.g. PBAs), respectively.

According to this embodiment, as the table T1(0) can be regarded as a compressed version of the hybrid table entry HT(0), any derivative table entries DTE(1) of the multiple derivative table entries {DTE(1)} may correspond to a certain table entry TE1(0) of the table entries {TE1(0)}, and may represent a continuous address length of one or more continuous physical addresses (e.g. one or more continuous PBAs) starting from the beginning physical address (e.g. a PBA) that are recorded as one or more continuous table entries starting from this table entry TE1(0) among the table entries {TE1(0)}. For example, the physical addresses {0x0000A000, 0x0000A001, 0x0000A002, 0x0000A009, 0x0000A004, 0x0000A005, 0x0000B00A, 0x0000A007, . . . } that appear in the T1 contents of Table 5 can be regarded as a series of continuous physical addresses except some discontinuities (e.g. break points) such as 0x0000A009, 0x0000B00A, etc., and the multiple derivative table entries {DTE(1)} of the derivative table DT(1), such as the Continuous Address Lengths {0x2, 0x1, 0x0, 0x0, 0x1, 0x0, 0, . . . }, can be utilized for indicating the continuous address lengths starting from the physical addresses {0x0000A000, 0x0000A001, 0x0000A002, 0x0000A009, 0x0000A004, 0x0000A005, 0x0000B00A, 0x0000A007, . . . }, respectively. Regarding the physical addresses {0x0000A000, 0x0000A001, 0x0000A002, 0x0000A009, 0x0000A004, 0x0000A005, 0x0000B00A, 0x0000A007, . . . } that appear in the T1 contents of Table 5, as there are three continuous physical addresses {0x0000A000, 0x0000A001, 0x0000A002} starting from the physical address 0x0000A000, the memory device 100 can record the continuous address length starting from the physical address 0x0000A000 to be equal to 0x2 as shown in Table 7; as there are two continuous physical addresses {0x0000A001, 0x0000A002} starting from the physical address 0x0000A001, the memory device 100 can record the continuous address length starting from the physical address 0x0000A001 to be equal to 0x1 as shown in Table 7; as there is only one continuous physical address {0x0000A002} starting from the physical address 0x0000A002, the memory device 100 can record the continuous address length starting from the physical address 0x0000A002 to be equal to 0x0 as shown in Table 7; as there is only one continuous physical address {0x0000A009} starting from the physical address 0x0000A009, the memory device 100 can record the continuous address length starting from the physical address 0x0000A009 to be equal to 0x0 as shown in Table 7; and the rest can be deduced by analogy.

As the continuity information such as the continuous address lengths clearly indicates the continuities and the discontinuities, the memory device 100 can read continuous data first, and read one or more segments of discontinuous data (e.g. break point data), such as valid data of one or more break points, and replace invalid data at the one or more break points with the one or more segments of discontinuous data to generate the data corresponding to the reading request (e.g. the HPB READ command), and then return the data corresponding to the reading request to the host device 50. For brevity, similar descriptions for these embodiments are not repeated in detail here.

TABLE 8

| HPB entry | T1 Content |
| --- | --- |
| 0 | 0x0000A000 |
| 1 | 0x0000A001 |
| 2 | 0x0000A002 |
| 3 | 0x0000A003 |
| 4 | 0x0000A004 |
| 5 | 0x0000A005 |
| 6 | 0x0000B009 |
| 7 | 0x0000A007 |
| 8 | 0x0000A008 |
| 9 | 0x0000A009 |
| 10 | 0x0000A00A |
| 11 | 0x0000B00A |
| 12 | 0x0000A00C |
| 13 | 0x0000A00D |
| 14 | 0x0000A00E |
| 15 | 0x0000A00F |
| ... | ... |

Table 8 illustrates an example of the table T1(0), where the notation " . . . " indicates that some table contents may be omitted for brevity. The HPB entries {0, 1, . . . } of Table 8 may represent the multiple table entries {TE1(0)}. In addition, the T1 contents (e.g. hexadecimal values) of Table 8 may represent the contents of the table T1(0) (e.g. the table entries {TE1(0)} of the table T1(0)). The physical addresses {0x0000A000, 0x0000A001, 0x0000A002, 0x0000A003, 0x0000A004, 0x0000A005, 0x0000B009, 0x0000A007, . . . } that appear in the T1 contents may be taken as examples of the associated physical addresses corresponding to the series of logical addresses. For brevity, similar descriptions for this embodiment are not repeated in detail here.

TABLE 9

| DT entry | Continuity Bit Map |
| --- | --- |
| 0 | 0xBDF (101111011111) |
| 1 | 0xDEF (110111101111) |
| 2 | 0xEF7 (111011110111) |
| 3 | 0xF7B (111101111011) |
| 4 | ... |
| 5 | ... |
| 6 | ... |
| 7 | ... |
| ... | ... |

Table 9 illustrates another example of the derivative table DT(1), where the notation " . . . " indicates that some table contents may be omitted for brevity. The derivative table (DT) entries {0, 1, . . . } of Table 9 may represent the multiple derivative table entries {DTE(1)} of the derivative table DT(1), where the multiple derivative table entries {DTE(1)} correspond to the multiple hybrid table entries {HTE} (e.g. {HTE(0)} or {HTE(1)}), respectively, and more particularly, indicate continuity information regarding the table entries {TE1} (e.g. PBAs) of the multiple hybrid table entries {HTE} (e.g. {HTE(0)} or {HTE(1)}), such as continuity bit maps with respect to the table entries {TE1(0)} (e.g. PBAs), respectively.

According to this embodiment, as the table T1(0) can be regarded as a compressed version of the hybrid table entry HT(0), any derivative table entries DTE(1) of the multiple derivative table entries {DTE(1)} may correspond to a certain table entry TE1(0) of the table entries {TE1(0)}, and may represent a continuity bit map of multiple subsequently recorded physical addresses (e.g. PBAs) coming after the beginning recorded physical address (e.g. a PBA) that are recorded as multiple subsequent table entries coming after this table entry TE1(0) among the table entries {TE1(0)}. For example, the physical addresses {0x0000A000, 0x0000A001, 0x0000A002, 0x0000A003, 0x0000A004, 0x0000A005, 0x0000B009, 0x0000A007, . . . } that appear in the T1 contents of Table 8 can be regarded as a series of continuous physical addresses except some discontinuities (e.g. break points) such as 0x0000B009, 0x0000B00A, etc., and the multiple derivative table entries {DTE(1)} of the derivative table DT(1), such as the Continuity Bit Maps {0xBDF, 0xDEF, 0xEF7, 0xF7B . . . } (e.g. {101111011111, 110111101111, 111011110111, 111101111011, . . . }, expressed with binary values thereof, respectively), can be utilized for indicating the continuity bit maps of multiple sets of subsequently recorded physical addresses coming after the beginning recorded physical addresses such as the physical addresses {0x0000A000, 0x0000A001, 0x0000A002, 0x0000A003, 0x0000A004, 0x0000A005, 0x0000B009, 0x0000A007, . . . }, respectively.

In addition, the bit count (e.g. the number of bits) of any continuity bit map (e.g. each continuity bit map) of the continuity bit maps can be equal to the address count (e.g. the number of physical addresses) of any set of subsequently recorded physical addresses (e.g. each set subsequently recorded physical addresses) of the multiple sets of subsequently recorded physical addresses, and more particularly, can be equal to 12, but the present invention is not limited thereto. In some examples, this bit count and this address count may vary. Regarding the physical addresses {0x0000A000, 0x0000A001, 0x0000A002, 0x0000A003, 0x0000A004, 0x0000A005, 0x0000B009, 0x0000A007, . . . } that appear in the T1 contents of Table 8, as there ten continuities and two discontinuities in the twelve subsequently recorded physical addresses {0x0000A001, 0x0000A002, 0x0000A003, 0x0000A004, 0x0000A005, 0x0000B009, 0x0000A007, . . . } coming after the physical address 0x0000A000, the memory device 100 can record the continuity bit map of this set of physical addresses {0x0000A001, 0x0000A002, 0x0000A003, 0x0000A004, 0x0000A005, 0x0000B009, 0x0000A007, . . . } to be 0xBDF as shown in Table 9, where the bits of the binary value 101111011111 thereof, starting from the Least Significant Bit (LSB) to the Most Significant Bit (MSB), indicate the respective continuity/discontinuity statuses of this set of physical addresses {0x0000A001, 0x0000A002, 0x0000A003, 0x0000A004, 0x0000A005, 0x0000B009, 0x0000A007, . . . }, respectively; as there ten continuities and two discontinuities in the twelve subsequently recorded physical addresses {0x0000A002, 0x0000A003, 0x0000A004, 0x0000A005, 0x0000B009, 0x0000A007, . . . } coming after the physical address 0x0000A001, the memory device 100 can record the continuity bit map of this set of physical addresses {0x0000A002, 0x0000A003, 0x0000A004, 0x0000A005, 0x0000B009, 0x0000A007, . . . } to be 0xDEF as shown in Table 9, where the bits of the binary value 110111101111 thereof, starting from LSB to the MSB, indicate the respective continuity/discontinuity statuses of this set of physical addresses {0x0000A002, 0x0000A003, 0x0000A004, 0x0000A005, 0x0000B009, 0x0000A007, . . . }, respectively; and the rest can be deduced by analogy.

As the continuity information such as the continuity bit maps clearly indicates the continuities and the discontinuities, the memory device 100 can read continuous data first, and read one or more segments of discontinuous data (e.g. break point data), such as valid data of one or more break points, and replace invalid data at the one or more break points with the one or more segments of discontinuous data to generate the data corresponding to the reading request (e.g. the HPB READ command), and then return the data corresponding to the reading request to the host device 50. For brevity, similar descriptions for these embodiments are not repeated in detail here.

According to some embodiments, the hybrid table HT may vary. For example, in a situation where there is no need of checking whether the local H2F address mapping table is correct or checking whether the physical address is correct according to the table entry TE2 of the aforementioned any hybrid table entry HTE of the multiple hybrid table entries {HTE} of the hybrid table HT, the table T2 in the hybrid table HT can be configured to carry dummy data. For another example, the memory device 100 (e.g. the memory controller 110) can respectively perform a predetermined entry processing on the multiple hybrid table entries {HTE} of the hybrid table HT in advance, for example, by encoding, scrambling, encrypting, etc., and provide the processed results of the multiple hybrid table entries {HTE} as respective replacements of the multiple hybrid table entries {HTE} to the host device 50, and can perform an inverse entry processing of the predetermined entry processing on a certain processed result received from the host device 50, for example, by decoding, descrambling, decrypting, etc., to recover the aforementioned any hybrid table entry HTE of the multiple hybrid table entries {HTE}. For brevity, similar descriptions for these embodiments are not repeated in detail here.

Figure 18:
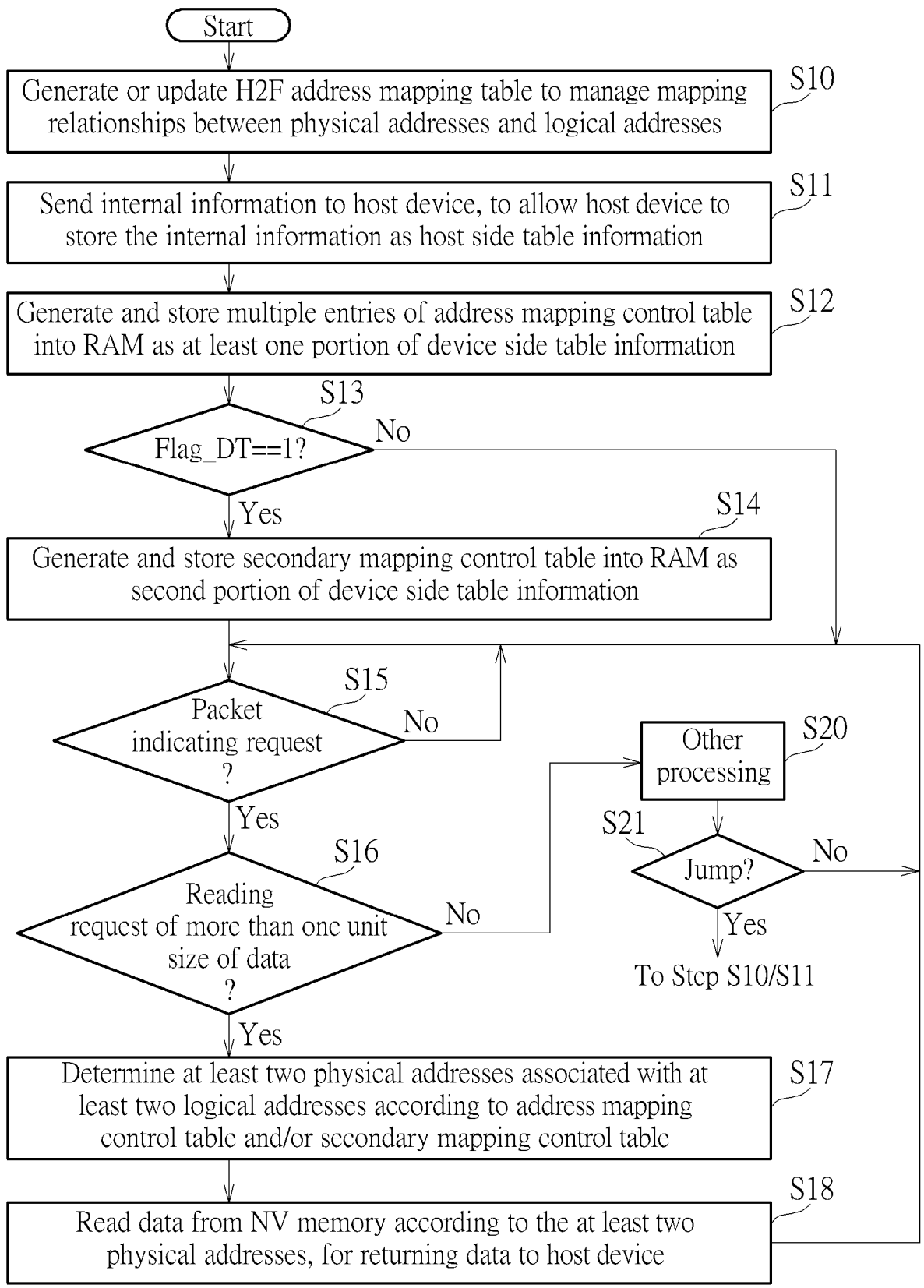
FIG. 18 illustrates a working flow of the method for performing access management of the memory device in the HPB architecture with aid of the device side table information according to an embodiment of the present invention.

FIG. 18 illustrates a working flow of the method for performing access management of the memory device in the HPB architecture with aid of the device side table information according to an embodiment of the present invention.

Under control of the processing circuit such as the microprocessor 112, the memory controller 110 can operate according to the method, and more particularly, control the operations of the memory device 100 according to the method.

In Step S10, the memory controller 110 can generate or update the aforementioned at least one H2F address mapping table (e.g. the global H2F address mapping table 120T) to manage the mapping relationships between the physical addresses and the logical addresses, for controlling data access of the NV memory 120. For example, the memory controller 110 can perform garbage collection to collect valid data into one or more blank physical blocks (e.g. erased physical blocks) in the NV memory 120, and update the aforementioned at least one H2F address mapping table (e.g. the global H2F address mapping table 120T) correspondingly, but the present invention is not limited thereto.

In Step S11, the memory controller 110 can send internal information (e.g. the hybrid table HT(0)) of the memory device 100 to the host device 50, to allow the host device 50 to store the internal information of the memory device 100 in a memory (e.g. the RAM 56) within the host device 50 as host side table information (e.g. the hybrid table HT(1)) at the host device 50. For example, the memory controller 110 can generate the internal information (e.g. the hybrid table HT(0)) according to the aforementioned at least one H2F address mapping table, and more particularly, load the local H2F address mapping table of the plurality of local H2F address mapping tables into the RAM 116 and add the corresponding protection information of this local H2F address mapping table (e.g. the physical address of this local H2F address mapping table, such as the latest physical address indicating the latest location where this local H2F address mapping table is stored in the NV memory 120) into the RAM 116, to generate the internal information such as the hybrid table HT(0), for being sent to the host device 50 as the host side table information such as the hybrid table HT(1).

In Step S12, the memory controller 110 can generate and store multiple entries of at least one address mapping control table (e.g. one or more address mapping control tables in one or more of the above embodiments, such as one or more tables of the hybrid table HT(0), the table T1(0), the table T1$_P$(0), etc.) into the RAM 116 within the memory controller 110 as at least one portion (e.g. a portion or all) of the device side table information at the memory device 100. For example, any entry of the multiple entries of the aforementioned at least one address mapping control table may comprise address information for address mapping, and the address information within the any entry may indicate a mapping relationship between a physical address and a logical address. For better comprehension, the multiple entries of the aforementioned at least one address mapping control table may comprise address information for address mapping, respectively, and the address information respectively carried by the multiple entries may indicate multiple mapping relationships between multiple physical addresses and multiple logical addresses, respectively.

Please note that the host side table information (e.g. the hybrid table HT(1)) may comprise address information respectively carried by the multiple entries of the aforementioned at least one address mapping control table. As mentioned above, the hybrid table HT kept by the memory device 100 in Step D05 can be referred to as the device side hybrid table such as the hybrid table HT(0), and the hybrid table HT stored by the host device 50 in Step D07 can be referred to as the host side hybrid table such as the hybrid table HT(1). Therefore, the hybrid table HT(1) can be regarded as coming from the hybrid table HT(0). When any table of the one or more tables of the hybrid table HT(0), the table T1(0), the table T1$_P$(0), etc. is taken as an example of the aforementioned at least one address mapping control table, the host side table information such as the hybrid table HT(1) may comprise address information that is found in any entry (e.g. each entry) among all entries of the any table.

In Step S13, the memory controller 110 can determine whether to generate at least one secondary mapping control table of the at least one address mapping control table according to a flag Flag_DT (labeled "Flag_DT==1" for better comprehension), where the memory controller 110 can set the flag Flag_DT as one of the logical values 0 and 1 according to one or more settings (e.g. default setting or user setting) in advance. If Yes (e.g. Flag_DT=1), Step S14 is entered; if No (e.g. Flag_DT=0), Step S15 is entered.

In Step S14, in a situation where the multiple entries of the at least one address mapping control table are stored into the RAM 116 as a first portion of the device side table information at the memory device 100, the memory controller 110 can generate and store the at least one secondary mapping control table of the at least one address mapping control table into the RAM 116 as a second portion of the device side table information at the memory device 100, where the at least one secondary mapping control table is related to the first portion of the device side table information, and is used as reference information for reading. For example, the at least one secondary mapping control table may comprise the aforementioned at least one derivative table (e.g. one or more derivative tables in one or more of the above embodiments, such as one or more tables of the derivative tables DT(0), DT(1), etc.) of the hybrid table HT.

In Step S15, the memory controller 110 can determine whether the host device 50 sends at least one packet for indicating at least one request to the memory device 100. If Yes (e.g. the memory controller 110 receives the aforementioned at least one packet from the host device 50), Step S16 is entered; if No (e.g. the memory controller 110 receives no packet from the host device 50), Step S15 is entered, in order to wait for the aforementioned at least one packet from the host device 50.

In Step S16, in response to the host device 50 sending the aforementioned at least one packet for indicating the aforementioned at least one request, the memory controller 110 can be determine whether a reading request of more than one unit size of data (e.g. a request of data reading of more than one logical address/LBA, where the transfer length is greater than one) among the aforementioned at least one request exists. The unit size may represent a predetermined unit size corresponding to a single logical address such as a single LBA, but the present invention is not limited thereto. If Yes (e.g. the reading request such as the request of data reading of more than one logical address exists, where the transfer length is greater than one), Step S17 is entered, for operating according to the reading request; if No (e.g. the reading request such as the request of data reading of more than one logical address does not exist, and more particularly, the aforementioned at least one request may comprise a non-reading request such as a writing request, or another type of reading request, such as a request of data reading of only one logical address with the transfer length being equal to one), Step S20 is entered, for operating according to other request(s). For example, a read command packet (e.g. the HPB READ command, more particularly, the command packet thereof) carrying at least the starting logical address and the data length of the reading request among the aforementioned at least one packet may indicate the reading request of more than one unit size of data. In this situation, the reading request of more than one unit size of data exists, and Step S17 is entered.

In Step S17, in response to the reading request (e.g. the HPB READ command) corresponding to at least two logical addresses from the host device 50, the memory controller 110 can determine at least two physical addresses associated with the at least two logical addresses according to the aforementioned at least one address mapping control table and/or the aforementioned at least one derivative table, where the reading request carries partial information of the host side table information, such as a corresponding hybrid table entry HTE(1) of the hybrid table HT(1). The reading request (e.g. the HPB READ command) may indicate that reading data of at least one address range comprising the at least two logical addresses is required, where the reading request may represent a request for reading data of the at least one address range comprising the at least two logical addresses.

For example, in a situation where Flag_DT=0 (which may indicate non-existence of the at least one derivative table during execution of Step S17), the memory controller 110 may operate as follows:

(1) when the at least one address mapping control table mentioned in Step S12 represents the hybrid table HT(0) shown in FIG. 11, the memory controller 110 can determine the at least two physical addresses according to the at least one address mapping control table such as the hybrid table HT(0) in Step S17; and (2) when the at least one address mapping control table mentioned in Step S12 represents the table T1(0) shown in FIG. 14, the memory controller 110 can determine the at least two physical addresses according to the at least one address mapping control table such as the table T1(0) shown in FIG. 14 in Step S17.

In some examples, in a situation where Flag_DT=1 (which may indicate existence of the at least one derivative table during execution of Step S17), the memory controller 110 may operate as follows:

(1) when the at least one address mapping control table mentioned in Step S12 represents the hybrid table HT(0) shown in FIG. 13, the memory controller 110 can determine the at least two physical addresses according to the at least one address mapping control table such as the hybrid table HT(0) shown in FIG. 13 and according to the at least one derivative table such as the derivative table DT(0) shown in FIG. 13;

(2) when the at least one address mapping control table mentioned in Step S12 represents the table T1$_P$(0) shown in FIG. 15, the memory controller 110 can determine the at least two physical addresses according to the at least one address mapping control table such as the table T1$_P$(0) shown in FIG. 15 and according to the at least one derivative table such as the derivative table DT(0) shown in FIG. 15;

(3) when the at least one address mapping control table mentioned in Step S12 represents the table T1(0) shown in FIG. 16, the memory controller 110 can determine the at least two physical addresses according to the at least one address mapping control table such as the table T1(0) shown in FIG. 16 and according to the at least one derivative table such as the derivative table DT(0) shown in FIG. 16; and (4) when the at least one address mapping control table mentioned in Step S12 represents the table T1(0) shown in FIG. 17, the memory controller 110 can determine the at least two physical addresses according to the at least one address mapping control table such as the table T1(0) shown in FIG. 17 and according to the at least one derivative table such as the derivative table DT(1) shown in FIG. 17.

Please note that the reading request (e.g. the HPB READ command) may carry only one entry of the multiple entries (e.g. an entry corresponding to one of the at least two logical addresses among the multiple entries). In response to the reading request (e.g. the HPB READ command) corresponding to the at least two logical addresses from the host device 50, the memory controller 110 can determine the at least two physical addresses associated with the at least two logical addresses according to the at least one address mapping control table and according to the only one entry of the multiple entries (e.g. the entry corresponding to one of the at least two logical addresses among the multiple entries). For better comprehension, the memory controller 110 can obtain the corresponding hybrid table entry HTE(1) from the read command packet (e.g. the HPB READ command, more particularly, the command packet thereof), and determine the at least two physical addresses with aid of the corresponding hybrid table entry HTE(1), but the present invention is not limited thereto. For example, the memory controller 110 can discard the corresponding hybrid table entry HTE(1) obtained from the read command packet when determining that the corresponding hybrid table entry HTE(1) is not useful.

In Step S18, the memory controller 110 can read data corresponding to the reading request from the NV memory 120 according to the aforementioned at least two physical addresses, for returning the data to the host device 50.

In Step S20, the memory controller 110 can perform other processing corresponding to the other request(s). For example, in response to the host device 50 sending the at least one packet for indicating the at least one request, the memory controller 110 determines whether a writing request among the at least one request exists. When the writing request among the at least one request exists, the memory controller 110 can perform data writing (e.g. data programming) on the NV memory 120, and update the aforementioned at least one H2F address mapping table (e.g. the global H2F address mapping table 120T, and more particularly, one or more of the plurality of local H2F address mapping tables) correspondingly, for indicating at least one latest mapping relationship between at least one physical address and at least one logical address of the data writing. For another example, in response to the host device 50 sending the at least one packet for indicating the at least one request, the memory controller 110 determines whether a request of data reading of only one logical address (e.g. the transfer length is equal to one) exists. When the request of data reading of only one logical address exists, the memory controller 110 can read the data of the only one logical address from the NV memory 120, for example, with aid of the corresponding hybrid table entry HTE(1) obtained from the read command packet, where the corresponding hybrid table entry HTE(1) may indicate the physical address for reading the data of the only one logical address. Afterward, Step S13 is entered. For brevity, similar descriptions for this embodiment are not repeated in detail here.

In Step S21, the memory controller 110 can determine whether to jump to a previous step such as any of Steps S10 and S11. For example, when determining that updating the aforementioned at least one H2F address mapping table is needed, the memory controller 110 can jump to Step S10. For another example, when determining that sending the internal information of the memory device 100 to the host device 50 is needed (e.g. the internal information such as the hybrid table HT(0) is changed or updated), the memory controller 110 can jump to Step S11.

For better comprehension, the method may be illustrated with the working flow shown in FIG. 18, but the present invention is not limited thereto. According to some embodiments, one or more steps may be added, deleted, or changed in the working flow shown in FIG. 18.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing access management of a memory device in a Host Performance Booster (HPB) architecture with aid of device side table information, the method being applied to a memory controller of the memory device, the memory device comprising the memory controller and a non-volatile (NV) memory, the NV memory comprising at least one NV memory element, the method comprising:
    sending internal information of the memory device to a host device, to allow the host device to store the internal information of the memory device in a memory within the host device as host side table information at the host device;
    generating and storing multiple entries of at least one address mapping control table into a random access memory (RAM) within the memory controller as at least one portion of the device side table information at the memory device, wherein any entry of the multiple entries of the at least one address mapping control table comprises address information for address mapping between a physical address and a logical address, wherein the host side table information comprises address information respectively carried by the multiple entries of the at least one address mapping control table;
    in response to a reading request corresponding to at least two logical addresses from the host device, determining at least two physical addresses associated with the at least two logical addresses according to the at least one address mapping control table, wherein the reading request carries partial information of the host side table information;
    reading data corresponding to the reading request from the NV memory according to the at least two physical addresses, for returning the data to the host device; and
    in response to a write buffer command corresponding to at least one HPB-related logical address range from the host device, marking a first address mapping control table corresponding to the at least one HPB-related logical address range among the at least one address mapping control table within the RAM as invalid, and deactivating the at least one HPB-related logical address range in response to the marking.

2. The method of claim 1, wherein the write buffer command comprises a first predetermined field for indicating the at least one HPB-related logical address range to be deactivated.

3. The method of claim 1, wherein the at least one HPB-related logical address range represents at least one HPB region among multiple HPB regions.

4. The method of claim 1, wherein the multiple entries of the at least one address mapping control table comprise address information for address mapping, respectively, and the address information respectively carried by the multiple entries indicate multiple mapping relationships between multiple physical addresses and multiple logical addresses.

5. The method of claim 1, wherein the reading request carries an entry corresponding to one of the at least two logical addresses among the multiple entries; and determining the at least two physical addresses associated with the at least two logical addresses according to the at least one address mapping control table further comprises:
in response to the reading request corresponding to the at least two logical addresses from the host device, determining the at least two physical addresses associated with the at least two logical addresses according to the at least one address mapping control table and according to the entry corresponding to the one of the at least two logical addresses.

6. The method of claim 1, wherein the reading request carries only one entry of the multiple entries.

7. The method of claim 6, wherein determining the at least two physical addresses associated with the at least two logical addresses according to the at least one address mapping control table further comprises:
in response to the reading request corresponding to the at least two logical addresses from the host device, determining the at least two physical addresses associated with the at least two logical addresses according to the at least one address mapping control table and according to the only one entry of the multiple entries.

8. The method of claim 1, wherein the multiple entries of the at least one address mapping control table are stored into the RAM as a first portion of the device side table information at the memory device; and the method further comprises:
generating and storing at least one secondary mapping control table into the RAM as a second portion of the device side table information at the memory device, wherein the at least one secondary mapping control table is related to the first portion of the device side table information, and is used as reference information for reading.

9. The method of claim 8, wherein determining the at least two physical addresses associated with the at least two logical addresses according to the at least one address mapping control table further comprises:
in response to the reading request corresponding to the at least two logical addresses from the host device, determining the at least two physical addresses associated with the at least two logical addresses according to the at least one address mapping control table and according to the at least one secondary mapping control table.

10. A memory device, comprising:
a non-volatile (NV) memory, arranged to store information, wherein the NV memory comprises at least one NV memory element; and
a controller, coupled to the NV memory, arranged to control operations of the memory device, wherein the controller comprises:
a processing circuit, arranged to control the controller according to a plurality of host commands from a host device, to allow the host device to access the NV memory through the controller; and
a random access memory (RAM), coupled to the processing circuit, arranged to provide the controller with internal storage space;
wherein:
the controller sends internal information of the memory device to the host device, to allow the host device to store the internal information of the memory device in a memory within the host device as host side table information at the host device;
the controller generates and stores multiple entries of at least one address mapping control table into a random access memory (RAM) within the controller as at least one portion of device side table information at the memory device, wherein any entry of the multiple entries of the at least one address mapping control table comprises address information for address mapping between a physical address and a logical address, wherein the host side table information comprises address information respectively carried by the multiple entries of the at least one address mapping control table;
in response to a reading request corresponding to at least two logical addresses from the host device, the controller determines at least two physical addresses associated with the at least two logical addresses according to the at least one address mapping control table, wherein the reading request carries partial information of the host side table information;
the controller reads data corresponding to the reading request from the NV memory according to the at least two physical addresses, for returning the data to the host device; and
in response to a write buffer command corresponding to at least one HPB-related logical address range from the host device, marking a first address mapping control table corresponding to the at least one HPB-related logical address range among the at least one address mapping control table within the RAM as invalid, and deactivating the at least one HPB-related logical address range in response to the marking.

11. An electronic device comprising:
a host device, comprising:
at least one processor, arranged for controlling operations of the host device; and
a power supply circuit, coupled to the at least one processor, arranged for providing power to the at least one processor and the memory device; and
a memory device coupled to the host device, comprising:
a non-volatile (NV) memory, arranged to store information, wherein the NV memory comprises at least one NV memory element; and
a controller, coupled to the NV memory, arranged to control operations of the memory device, wherein the controller comprises:
a processing circuit, arranged to control the controller according to a plurality of host commands from the host device, to allow the host device to access the NV memory through the controller; and
a random access memory (RAM), coupled to the processing circuit, arranged to provide the controller with internal storage space;
wherein:
the controller sends internal information of the memory device to the host device, to allow the host device to store the internal information of the memory device in a memory within the host device as host side table information at the host device;
the controller generates and stores multiple entries of at least one address mapping control table into a random access memory (RAM) within the controller as at least one portion of device side table information at the memory device, wherein any entry of the multiple entries of the at least one address mapping control table comprises address information for address mapping between a physical address and a logical address, wherein the host side table information comprises address information respectively carried by the multiple entries of the at least one address mapping control table;

in response to a reading request corresponding to at least two logical addresses from the host device, the controller determines at least two physical addresses associated with the at least two logical addresses according to the at least one address mapping control table, wherein the reading request carries partial information of the host side table information;

the controller reads data corresponding to the reading request from the NV memory according to the at least two physical addresses, for returning the data to the host device; and in response to a write buffer command corresponding to at least one HPB-related logical address range from the host device, the controller marks a first address mapping control table corresponding to the at least one HPB-related logical address range among the at least one address mapping control table within the RAM as invalid, and deactivating the at least one HPB-related logical address range in response to the marking;

wherein the memory device provides the host device with storage space.

12. A controller of a memory device, the memory device comprising the controller and a non-volatile (NV) memory, the NV memory comprising at least one NV memory element, the controller comprising:

a processing circuit, arranged to control the controller according to a plurality of host commands from a host device, to allow the host device to access the NV memory through the controller; and a random access memory (RAM), coupled to the processing circuit, arranged to provide the controller with internal storage space;

wherein:

the controller sends internal information of the memory device to the host device, to allow the host device to store the internal information of the memory device in a memory within the host device as host side table information at the host device;

the controller generates and stores multiple entries of at least one address mapping control table into the RAM within the controller as at least one portion of device side table information at the memory device, wherein any entry of the multiple entries of the at least one address mapping control table comprises address information for address mapping between a physical address and a logical address, wherein the host side table information comprises address information respectively carried by the multiple entries of the at least one address mapping control table;

in response to a reading request corresponding to at least two logical addresses from the host device, the controller determines at least two physical addresses associated with the at least two logical addresses according to the at least one address mapping control table, wherein the reading request carries partial information of the host side table information;

the controller reads data corresponding to the reading request from the NV memory according to the at least two physical addresses, for returning the data to the host device; and in response to a write buffer command corresponding to at least one HPB-related logical address range from the host device, marking a first address mapping control table corresponding to the at least one HPB-related logical address range among the at least one address mapping control table within the RAM as invalid, and deactivating the at least one HPB-related logical address range in response to the marking.

* * * * *